(12) United States Patent
Miyajima et al.

(10) Patent No.: US 6,637,780 B2
(45) Date of Patent: Oct. 28, 2003

(54) QUICK-ACTION CONNECTOR ASSEMBLY INCLUDING A LATCHING INDICATOR MEMBER

(75) Inventors: Atsuo Miyajima, Inuyama (JP); Akira Takayanagi, Nishikasugai-Gun (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/115,848

(22) Filed: Apr. 3, 2002

(65) Prior Publication Data

US 2002/0145283 A1 Oct. 10, 2002

(30) Foreign Application Priority Data

Apr. 6, 2001 (JP) ........................................ 2001-107975

(51) Int. Cl.⁷ ................................................. F16L 37/00
(52) U.S. Cl. .......................... 285/305; 285/93; 285/319; 285/308
(58) Field of Search ................................. 285/305, 308, 285/319, 93

(56) References Cited

U.S. PATENT DOCUMENTS

| | | | |
|---|---|---|---|
| 4,753,458 A | * 6/1988 | Case et al. ..................... | 285/93 |
| 4,915,421 A | * 4/1990 | Dennany, Jr. ................. | 285/39 |
| 4,948,176 A | 8/1990 | Bartholomew | |
| 5,456,500 A | * 10/1995 | Klinger et al. ................. | 285/93 |
| 5,542,712 A | * 8/1996 | Klinger et al. ................. | 285/93 |
| 5,607,190 A | * 3/1997 | Exandier et al. .............. | 285/93 |
| 5,779,279 A | * 7/1998 | Bartholomew ............... | 285/93 |
| 5,924,746 A | * 7/1999 | Fixemer ....................... | 285/93 |
| 6,328,344 B1 | 12/2001 | Tozaki et al. | |
| 6,334,632 B1 | * 1/2002 | Nishio et al. .................. | 285/92 |
| 6,428,055 B1 | * 8/2002 | Moretti et al. ............... | 285/319 |

FOREIGN PATENT DOCUMENTS

| | | | |
|---|---|---|---|
| JP | 3-17115 | 4/1991 | |
| JP | 5/52284 | * 3/1993 | ................. 285/319 |
| JP | 5/52285 | * 3/1993 | ................. 285/319 |
| JP | 5-280678 | * 10/1993 | ................. 285/305 |

OTHER PUBLICATIONS

U.S. patent application Ser No. 09/830,601, Miyajima et al., filed Apr. 27, 2001.

* cited by examiner

Primary Examiner—David Bochna
Assistant Examiner—James M. Hewitt
(74) Attorney, Agent, or Firm—Burr & Brown

(57) ABSTRACT

A quick-action connector assembly including a male member, a female member, a latching indicator member substantially fitted within the female member, a first engaging device for permitting engagement of the indicator member and the male member and a second engaging device for substantially inhibiting rotation of the indicator member relative to the female member, prior to insertion of the male member into the female member, and for disengaging the indicator member and the female member from each other, to permit the rotation of the indicator member relative to the female member, on the basis of the movement of the indicator member with the male member, after an annular protrusion formed on the male member has been latched in engagement with a letching projecting of at least one elastically deformable latching arm provided on the female member as a result of the insertion of the male member into the female member.

8 Claims, 15 Drawing Sheets

US 6,637,780 B2

1

QUICK-ACTION CONNECTOR ASSEMBLY INCLUDING A LATCHING INDICATOR MEMBER

This application is based on Japanese Patent Application No. 2001-107975 filed on Apr. 6, 2001, the contents of which are incorporated hereinto by reference.

BACKGROUND OF THE INVENTION

1. Field of the Invention

The present invention relates in general to a quick-action connector assembly, and more particularly to a quick-action connector assembly including a tubular male member having an annular protrusion formed on the outer circumferential surface of an engaging end portion thereof, and a female member in which the engaging end portion of the male member is inserted in one axial direction such that the annular protrusion is latched in engagement with a latching projection provided on the female member, whereby the male member and the female member are connected to each other by a single quick action to cause an axial relative movement of the female and male members.

2. Discussion of Related Art

There are known quick-action connector assemblies of various arrangements of the type described above. In one example of the such quick-action connector assembly, the female member includes a cylindrical portion as one axial end portion in which the corresponding end portion of the male member can be inserted. The cylindrical wall of the cylindrical portion of the female member has latching arms which are elastically deformable or displaceable in the radial direction and which have latching projections projecting in the radially inward direction. When the male member having the annular protrusion formed at the inner end of the outer circumferential surface of its engaging end portion is inserted into the cylindrical portion of the female member, the annular protrusion of the male member causes elastic deformation of the latching arms of the cylindrical portion of the female member in the radially outward direction of the cylindrical portion, so that the annular protrusion is moved in sliding contact with the latching projections from one side to the other side of the latching projections, whereby the annular protrusion of the male member is latched in engagement with the latching projections, so as to inhibit a movement of the male member in the axial direction away from the female member, that is, to prevent removal of the male member from the female member.

In the quick-action connector assembly arranged as described above, a single quick action to cause a relative axial movement of the male and female members for moving the engaging end portion of the male member into the cylindrical portion of the female member permits the annular protrusion of the male member to be latched in engagement with the latching projections of the female member, so that the male and female members can be considerably easily and quickly connected to each other. Although the known quick-action connector assembly has an advantage as described above, this connector assembly has a drawback that it is difficult to inspection the connector assembly externally of the female member, to check if the annular protrusion of the male member has been stably latched in engagement with the latching projections of the female member, that is, if the male and female members have been completely connected to each other, since the latching between the annular protrusion and the latching projections takes place within the female member.

2

Where the quick-action connector assembly is used for connecting two pipes or hoses for flows of a certain fluid in a fluid transporting system, there is a risk of a leakage flow of the fluid from the connection between the male and female members of the connector assembly, if the fluid is transported through the fluid transporting system, in the event of a failure of the male and female members to achieve stable or complete latching between the annular protrusion and the latching projections.

JP-Y2-3-17115 and U.S. Pat. No. 6,328,344 B1 disclose a connector assembly or tube joint which is arranged to permit easy checking as to whether the male and female members have been completely connected to each other.

Described more specifically, the connector assembly or pipe joint disclosed in the above-identified publications includes a female member (tubular joint) into which a male member (pipe) is inserted. The female member includes an axial end portion whose cylindrical wall has elastically deformable or displaceable latching arms (pipe retainer) and windows formed therethrough. Further, the axial end portion of the female member is provided with a latching indicator member (connection checker) which is a generally C-shaped or U-shaped member having a pair of leg portions that are elastically deformable or displaceable such that the two leg portions are moved toward and away from each other. The latching indicator member is fitted in the axial end portion of the female member such that inner parts of the leg portions project through the respective windows into the female member. When the engaging end portion of the male member is inserted into the axial end portion of the female member, the annular protrusion of the male member is brought into latching engagement with the latching projections of the latching arms for connection of the male and female members, while at the same time the pair of leg portions of the latching indicator member are elastically displaced away from each other directly by the annular protrusion of the male member, or indirectly by the annular protrusion via a suitable pusher member or slider, in the radially outward direction of the female member, so that the latching indicator member can be removed from the female member. Then, the latching indicator member is removed from the female member.

In the quick-action connector assembly or pipe joint disclosed in the above-identified publications, it is possible to easily check if the annular protrusion of the male member has been latched in engagement with the latching projections of the latching arms of the female member as a result of insertion of the male member into the female member, that is, if the male and female members have been completely or stably connected to each other, depending upon whether the latching indicator member is placed in a position in which the latching indicator member can be removed from the female member.

In the connector assembly of the type described above, however, the latching indicator member (connection checker) is removed from the female member after the male and female members have been completely or stably connected to each other. If the male and female members are once disconnected from each other and are again connected to each other, no means is available to check if the male and female members have been completely connected to each other, so that the connector assembly cannot be easily inspected for complete connection of the male and female members after these members are once disconnected from each other.

SUMMARY OF THE INVENTION

The present invention was made in view of the background art described above. It is therefore an object of the present invention to provide a quick-action connector assembly which permits accurate and easy checking as to whether the male and female members have been completely connected to each other, each time an action to connect these male and female members is effected following disconnection of the male and female members.

The above object may be achieved according to the principle of the present invention, which provides a quick-action connector assembly including a tubular male member having an engaging end portion and an annular protrusion formed on an outer circumferential surface of the engaging end portion, and a female member having a cylindrical end portion into which the male member is to be inserted and which has a cylindrical wall formed with at least one latching arm each of which has a latching projection extending radially inwardly of the cylindrical wall, each of the at least one latching arm being elastically deformable in a radial direction of the cylindrical end portion, and wherein elastic deformation of each latching arm in a radially outward direction of the cylindrical end portion of the female member during insertion of the male member into the cylindrical end portion permits the annular protrusion to clear the latching projection of each latching arm and to be latched in engagement with the latching projection, so as to prevent an axial movement of the male member in a direction away from the female member, the quick-action connector assembly comprising:

(a) a latching indicator member into which the male member can be inserted and which is substantially cylindrical in shape and assembled with the cylindrical end portion of the female member;

(b) first engaging means interposed between the latching indicator member and the male member, for effecting engagement between the latching indicator member and the male member upon insertion of the male member into the cylindrical end portion of the female member, to permit an axial movement of the latching indicator member together with the male member in a direction of insertion of the male member; and (c) second engaging means interposed between the latching indicator member and the female member, for effecting engagement between the latching indicator member and the female member, to substantially inhibit rotation of the latching indicator member relative to the female member, prior to the insertion of the male member into the cylindrical end portion of the female member, and for disengaging the latching indicator member and the female member from each other, to permit the rotation of the latching indicator member relative to the female member, on the basis of the axial movement of the latching indicator in the direction of insertion of the male member by the first engaging means, after the annular protrusion has been latched in engagement with the latching projection of each latching arm as a result of the insertion of the male member into the cylindrical end portion, and wherein a checking if the annular protrusion of the male member inserted into the female member has been latched in engagement with the latching projection of each latching arm can be effected depending upon whether the rotation of the latching indicator member relative to the female member is inhibited or permitted.

In the quick-action connector assembly of the present invention constructed as described above, the latching indicator member rotatably fitted substantially within or on the cylindrical end portion of the female member is substantially inhibited by the second engaging member, from rotating relative to the female member, with the latching indicator member held in engagement with the female member, before the male member is inserted into the cylindrical end portion of the female member. When the male member is inserted into the cylindrical end portion of the female member, the first engaging means permits the latching indicator member to be brought into engagement with the annular protrusion of the male member, and to be moved with the male member in the direction of the insertion of F the male member, until the latching indicator member has been moved to a latching position at which the annular protrusion of the male member has been latched in engagement with the latching projection of the latching arm and at which the engagement between the latching indicator member and the female member by the second engaging means is completely released, to thereby permit the rotation of the latching indicator member relative to the female member. The function of the second engaging means to "substantially inhibit" rotation of the latching indicator member relative to the female member is interpreted to mean either complete prevention of the rotation of the latching indicator member relative to the female member, or prevention of the relative rotation of the latching indicator member by more than a predetermined small angle below which the rotation can be considered to be a tolerable amount of play. On the other hand, the function of the second engaging means to "permit" the rotation of the latching indicator member relative the female member is interpreted to mean permission of free rotation of the latching indicator member relative to the female member by more than the predetermined small angle.

In the quick-action connector assembly of the present invention, the user tries to rotate the latching indicator member relative to the female member after the male member has been inserted into the cylindrical end portion of the female member. If the rotation of the latching indicator member relative to the female member is not permitted, this indicates that the annular protrusion of the male member has not been latched in engagement with the latching projection of each latching arm of the female member, thereby indicating that the male member has not been completely connected to the female member. If the rotation of the latching indicator member relative to the female member is permitted, this indicates that the annular protrusion of the male member has been stably latched in engagement with the latching projection of the latching arm, thereby indicating that the male member has been completed connected to the female member.

Thus, the quick-action connector assembly according to the present invention makes it possible to check if the male member has been completely connected to the female member, depending upon whether the rotation of the latching indicator member relative to the female member is permitted or not, or whether the angle of the permitted relative rotation is larger than a predetermined value or not. This checking is possible is possible with the latching indicator member held assembled with the female member, that is, without removal of the latching indicator member, unlike a latching indicator member used in the known quick-action connector assembly wherein the latching indicator member is removed when the checking as to whether the male member has been completely connected to the female member or not is effected depending upon whether the latching indicator member can be removed from the female member or not.

Accordingly, the quick-action connector assembly according to the present invention can be accurately and easily checked for complete connection of the male member and the female member, each time an operation to connect the male member and the female member is performed, even where the operations to connect and disconnect the male and female members to and from each other are repeatedly performed. Where the present quick-action connector assembly is used for connecting two pipes or hoses for flows of a certain fluid in a fluid transporting system, the arrangement according to the present invention is effective to prevent a leakage flow of the fluid from the connection between the male and female members of the connector assembly, which leakage flow would take place if the fluid were transported through the fluid transporting system while the connection between the male and female members is incomplete.

According to a first preferred form of the present invention, the quick-action connector assembly further comprises third engaging means interposed between the latching indicator member and the female member, for effecting engagement between the latching indicator member and the female member, to substantially inhibit an axial movement of the latching indicator member in the direction of insertion of the male member, prior to the insertion of the male member into the cylindrical end portion of the female member, and for disengaging the latching indicator member and the female member from each other, to permit the axial movement of the latching indicator member in the direction of insertion, after the annular protrusion of the male member has cleared the latching projection of each latching arm on the basis of the elastic deformation of each latching arm in the radially outward direction of the cylindrical end portion of the female member during the insertion of the male member into the cylindrical end portion.

In the quick-action connector assembly according to the first preferred form of this invention described above, the latching indicator member is not unnecessarily moved in its axial direction relative to the female member, before the male member has been inserted into the female member. Further, the present preferred form of the invention is effective to prevent an axial movement of the latching indicator member to a position for permitting the rotation of the latching indicator member relative to the female member, before the annular protrusion of the male member has been latched in engagement with the latching projection of each latching arm. Accordingly, the present arrangement assures a further improvement in the accuracy of checking as to whether the male and female members have been completely connected to each other, depending upon whether the rotation of the latching indicator member relative to the female member is permitted or not, or whether the angle of the permitted relative rotation is larger than a predetermined value or not.

According to one advantageous arrangement of the above first preferred form of the present invention, each latching arm has an inner surface on which the latching projection is formed, and the third engaging means includes an engaging protrusion formed on the inner surface of each latching arm, and a receptacle formed in a cylindrical wall of the latching indicator such that the engaging protrusion is engageable with the receptacle, the cylindrical wall of the latching member having opposed surfaces which partially define the receptacle and which are opposed to each other in the direction of insertion of the male member, the engaging protrusion being held in engagement with the opposed surfaces of the receptacle prior to the insertion of the male member into the cylindrical end portion of the female member, to thereby substantially inhibit the axial movement of the latching indicator member in the above-indicated direction of insertion, and wherein the engaging protrusion is disengaged from the receptacle, to permit the axial movement of the latching indicator member in the above-indicated direction of insertion, when the annular protrusion of the male member has cleared the latching projection of each latching arm on the basis of the elastic deformation of said latching arm in the radially outward direction during the insertion of the male member into the cylindrical end portion. The present arrangement of the third engaging means is comparatively simple, but assures accurate checking as to whether the male member and the female member have been completely connected to each other.

According to a second preferred form of the present invention the first engaging means includes the annular protrusion of the male member, and an engaging inward flange formed on the latching indicator member such that the engaging inward flange extends in a radially inward direction of the latching indicator member, the annular protrusion being engageable with the engaging inward flange during the insertion of the male member into the cylindrical end portion of the female member, so that the latching indicator member is moved together with the male member in the direction of insertion of the male member. In the present form of the invention, the arrangement of the first engaging means is comparatively simple, but permits stable axial movement of the latching indicator member together with the male member during the insertion of the male member into the female member.

According to a third preferred form of this invention, the second engaging means includes at least one projection formed on one of two portions of the latching indicator member and the female member, which two portions are opposed to each other in the radial direction of the female member, and at least one recess formed in the other of the two portions, and wherein before the insertion of the male member into the cylindrical end portion of the female member, the above-indicated at least one projection is held in engagement with opposed surfaces which partially define the above-indicated at least one recess and which are opposed to each other in a circumferential direction of the female member, so that the rotation of the latching indicator member relative to the female member is substantially inhibited, the above-indicated at least one projection being disengaged from the above-indicted at last one recess, as a result of the axial movement of the latching indicator member together with the male member in the direction of insertion of the male member during the insertion of the male member into the cylindrical end portion of the female member, which axial movement is permitted by the first engaging means after the annular protrusion of the male member has been latched in engagement with the latching projection of each latching arm, so that the rotation of the latching indicator member relative to the female member is permitted, while the annular protrusion is latched in engagement with the latching projection. In the present third preferred form of the invention, the arrangement of the second engaging means is comparatively simple, but permits reliable functioning of the second engaging means to substantially inhibit the rotation of the latching indicator member relative to the female member prior to the insertion of the male member into the female member, and permit the relative rotation of the latching indicator member and the female member after the male member has been inserted to the female member.

According to a fourth preferred form of the present invention, the second engaging means includes the latching projection of the each latching arm, and an opening formed in a cylindrical wall of the latching indicator member such that a dimension of the opening as measured in the direction of insertion of the male member is large enough to permit the latching projection to be received in the opening, the opening consisting of a narrow portion and a wide portion which are respectively located downstream and upstream in the direction of insertion, and wherein before the insertion of the male member into the cylindrical end portion of the female member, at least a portion of the latching projection is held in engagement with opposed surfaces which partially define the narrow portion of the opening and which are opposed to each other in a circumferential direction of the latching indicator member, so that the rotation of the latching indicator member relative to the female member is substantially inhibited, the latching projection being moved into the wide portion of the opening and disengaged from the narrow portion, as a result of the axial movement of the latching indicator member together with the male member in the direction of insertion of the male member during the insertion of the male member into the cylindrical end portion of the female member, which axial movement is permitted by the first engaging means after the annular protrusion of the male member has been latched in engagement with the latching projection of the each latching arm, so that the latching indicator member is permitted to be rotated relative to the female member by an angle corresponding to a dimension of the wide portion as measured in the circumferential direction, while the annular protrusion is latched in engagement with the latching projection.

In the quick-action connector assembly according to the fourth preferred form of the invention, the latching projection of each latching arm provided to latch the annular protrusion of the male member is utilized to effect the engagement of the latching indicator member with the female member for substantially inhibiting the rotation of the latching indicator member relative to the female member prior to the insertion of the male member into the female member. Thus, the present form of the invention does not require a member exclusively designed to effect the engagement of the latching indicator member with the female member for substantially inhibiting the rotation of the latching indicator member relative to the female member. Accordingly, the present form of the invention effectively prevents complexity in construction of the quick-action connector assembly due to the provision of the second engaging means for substantially inhibiting the relative rotation of the latching indicator member and the female member.

According to a fifth preferred form of this invention, the quick-action connector assembly further comprises a locking mechanism operable to lock the latching indicator member in a predetermined angular position relative to the female member, for preventing free rotation of the latching indicator member relative to the female member, while the second engaging means is placed in a state of permitting the rotation of the latching indicator member relative to the female member, after the annular protrusion of the male member inserted in the cylindrical end portion of the female member has been latched in engagement with the latching projection of each latching arm.

In the quick-action connector assembly according to the fifth preferred form of the invention, the lock mechanism is provided to lock the latching indicator member in the predetermined angular position relative to the female member, after the male member has been completely connected to the female member with the annular protrusion of the male member held latched by the latching projection of each latching arm. The locking mechanism prevents unnecessary free rotation of the latching indicator member. In addition, the checking as to whether the male member and the female member have been completely connected to each other can be made by simple visual inspection as to whether the latching indicator member is placed in the predetermined angular position, and without having to try to rotate the latching indicator member.

According to a sixth preferred form of this invention, each latching arm has an inner surface on which the latching projection is formed, the inner surface of the latching arm providing an inclined cam surface which extends in a circumferential direction of the female member and which is inclined such that a position of the inclined cam surface in a radial direction of the female member gradually increases in the circumferential direction, and the latching indicator member includes a slidably contacting portion which slidably moves on the inclined cam surface during rotation of the latching indicator member relative to the female member, to cause elastic deformation of each latching arm in the radially outward direction of the female member, for thereby disengaging the annular protrusion of the male member from the latching projection of each latching arm.

In the quick-action connector assembly according to the sixth preferred form of this invention, the male member which has been connected to the female member can be removed from the female member, by simply rotating the latching indicator member relative to the female member, to cause a sliding movement of the slidably contacting portion on the inclined cam surface, until the latching indicator member is rotated to an angular position in which the latching of the annular protrusion of the male member by the latching projection of each latching arm is released.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENT

To further clarify the present invention, there will be described in detail quick-action connector assemblies constructed according to the preferred embodiments of this invention, by reference to the accompanying drawings.

Figure 1:
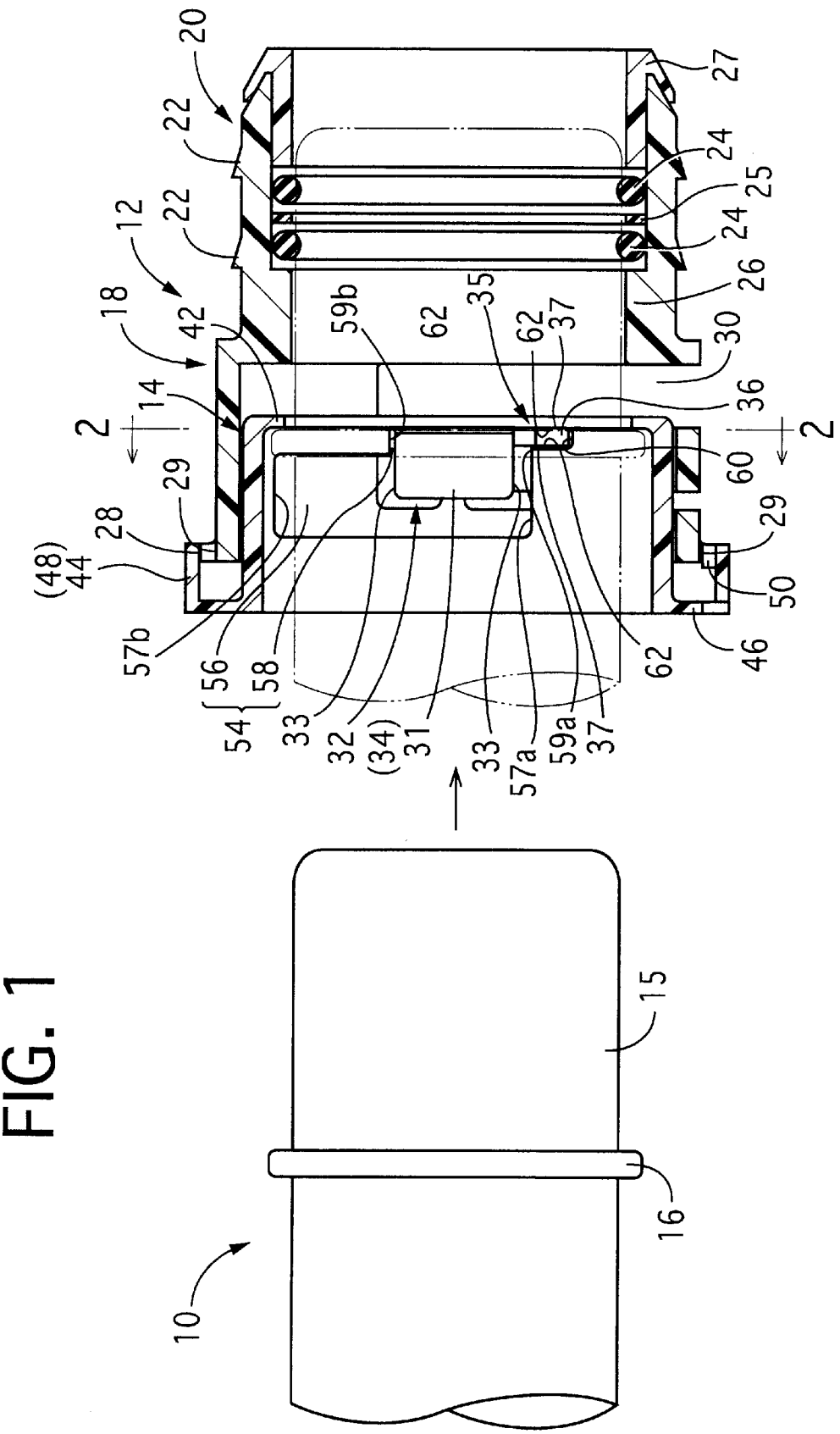
FIG. 1 is a view in axial cross section of a quick-action connector assembly according to one embodiment of this invention.
Figure 2:
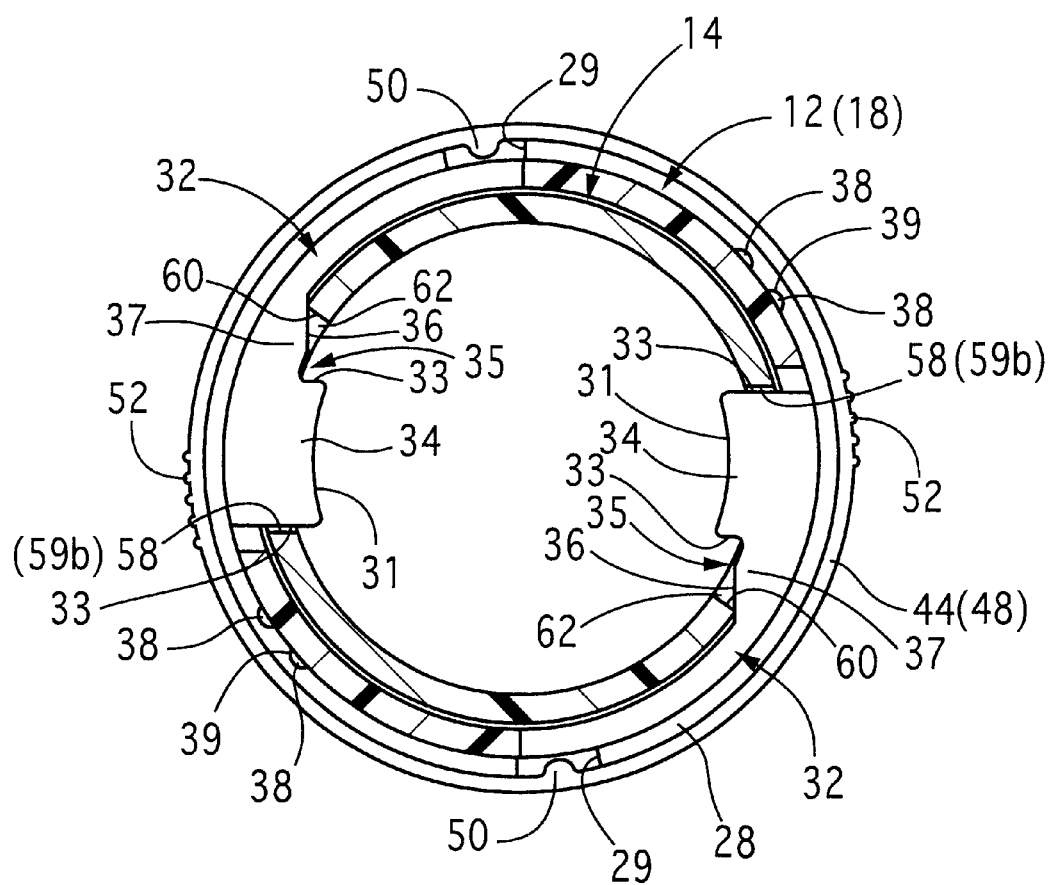
FIG. 2 is a view in transverse cross section taken along line 2—2 of FIG. 1.

Referring first to the views in axial and transverse cross sections of FIGS. 1 and 2, there is schematically shown a quick-action connector assembly according to a first embodiment of this invention. As shown in these figures, the quick-action connector assembly according to this invention includes a male member in the form of a pipe 10, a female member in the form of a female connector 12 into which the pipe 10 is partially inserted in a direction indicated in FIG. 1, and a latching indicator member 14 fitted substantially within the female connector 12 such that the member 14 is substantially entirely received within the female connector 12.

Described more specifically, the pipe 10 is a straight pipe formed of a soft steel and includes an engaging end portion 15 to be inserted into the female connector 12. The engaging end portion 15 has an annular protrusion 16 formed at an axial position which is spaced from the axial end of the pipe 15 by a suitable distance. The annular protrusion 16 is formed by a suitable plastic forming process, for instance. It is needless to say that the steel pipe 10 may be replaced by a resin pipe or a rubber tube or hose.

On the other hand, the female connector 12 may be a one-piece member formed of a resin material such as a glass-fiber reinforced nylon resin, for example. As shown in FIGS. 3 and 4, the female connector 12 is a generally stepped cylindrical member wherein one axial portion (on the left side as seen in FIGS. 3 and 4) thereof has a diameter which is larger than that of the other axial portion (on the right side as seen in FIGS. 3 and 4) by a suitable amount. Namely, the female connector 12 consists of one axial portion in the form of a large-diameter cylindrical portion 18 into which the engaging end portion 15 of the pipe 10 is to be inserted, and the other axial portion in the form a small-diameter cylindrical portion 20 on which a desired tubular member (not shown) such as a hose or tube to be connected to the pipe 10 is to be fixedly fitted.

On the outer circumferential surface of the small-diameter cylindrical portion 20 of the female connector 12, there are formed a plurality of annular barbs 22 such that the annular barbs 22 are spaced from each other in the axial direction of the cylindrical portion 20. These annular barbs 22 function to prevent removal of the above-indicated tubular member from the small-diameter cylindrical portion 20. Within a bore of the small-diameter cylindrical portion 20, there are fixedly disposed two O-rings 24, 24 for contact with the outer circumferential surface of the engaging end portion 15 of the pipe 10 between the annular protrusion 16 and the axially outer end of the pipe 10 when the pipe 10 has been inserted into the female connector 12, with the annular protrusion 16 located within the large-diameter cylindrical portion 18. The two O-rings 24, 24 are provided for maintaining fluid tightness between the outer circumferential surface of the pipe 10 and the inner circumferential surface of the female connector 12. The O-rings 24, 24 are fixedly disposed such that a collar 25 is sandwiched by and between the two O-rings 24, 24 and such that an assembly of the O-rings 24, 24 and the collar 25 is sandwiched by and between a shoulder surface of a thick-walled end part 26 of the small-diameter cylindrical portion 20 on the side of the large-diameter cylindrical portion 18, and a retaining bushing 27 fitted in the end part of the bore of the small-diameter cylindrical portion 20 on the side of the large-diameter cylindrical portion 18.

The large-diameter cylindrical portion 18 has an integrally formed outward flange 28 formed at its axial end on the side of the pipe 10 such that the outward flange 28 extends radially outwards by a suitable radial dimension from the outer circumferential surface of the cylindrical portion 18 and such that the outward flange 28 is formed over substantially the entire circumference of the cylindrical portion 18. The outward flange 28 has two axial grooves 29 formed at respective diametrically opposite circumferential positions thereof such that the axial grooves 29 extend in the axial direction of the outward flange 28, so as to divide the circumferential of the outward flange 28 into two separate halves.

Figure 16:
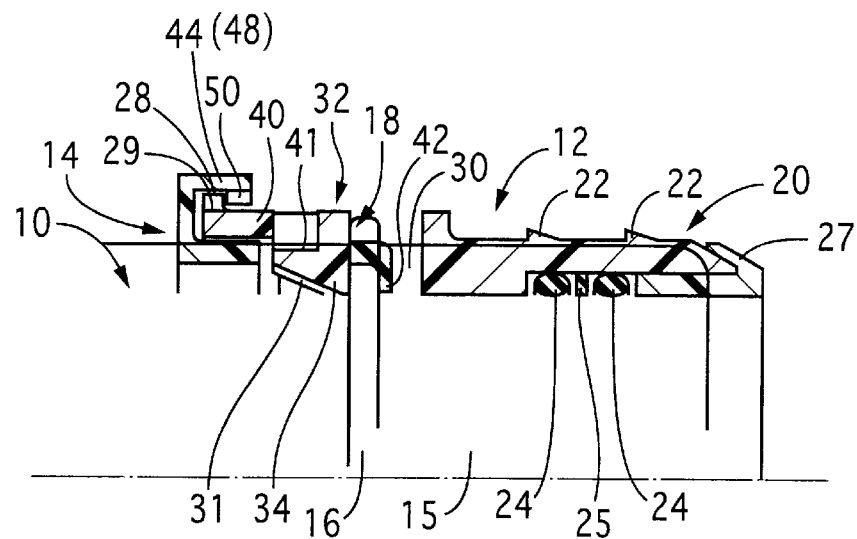
FIG. 16 is a partial cross sectional view showing the pipe and the female connector of the quick-action connector assembly of FIG. 1 in a mutually latched state.

The cylindrical wall of the large-diameter cylindrical portion 18 of the female connector 12 has two U-shaped slots 30 formed such that the two slots 30 are spaced apart from each other in the circumferential direction of the cylindrical portion 18, in a symmetrical relationship with each other with respect to the axis of the cylindrical portion 18. In the presence of these two U-shaped slots 30, there cylindrical wall of the large-diameter cylindrical portion 18 is provided with integrally formed two latching arms 32, 32 each extending in its circumferential direction from a fixed end toward a free end, in a symmetrical relationship with each other with respect to the axis of the cylindrical portion 18. These latching arms 32, 32 are elastically deformable or displaceable in the radial direction of the cylindrical portion 18, due to elasticity (resilient property) of the resin material of the cylindrical portion 18. Each of the two U-shaped slot 30 defining the respective two latching arms 32, 32 has two arms which are located on the respective opposite sides of the latching arm 32 and which are spaced from each other by the latching arm 32 in the axial direction of the cylindrical portion 18. One of the two arms which is located on the front side of the latching arm 32 as seen in the direction of insertion of the pipe 10 into the large-diameter portion 18 (namely, the arm on the side of the small-diameter cylindrical portion 20) has a large dimension as measured in the axial direction of the cylindrical portion 18 than the other arm. The axial dimension of this arm (hereinafter referred to as "first arm") on the front side of the latching arm 32 is large enough to accommodate the axial direction of the annular protrusion 16 of the pipe 10, as indicated in FIG. 16.

Figure 3B:
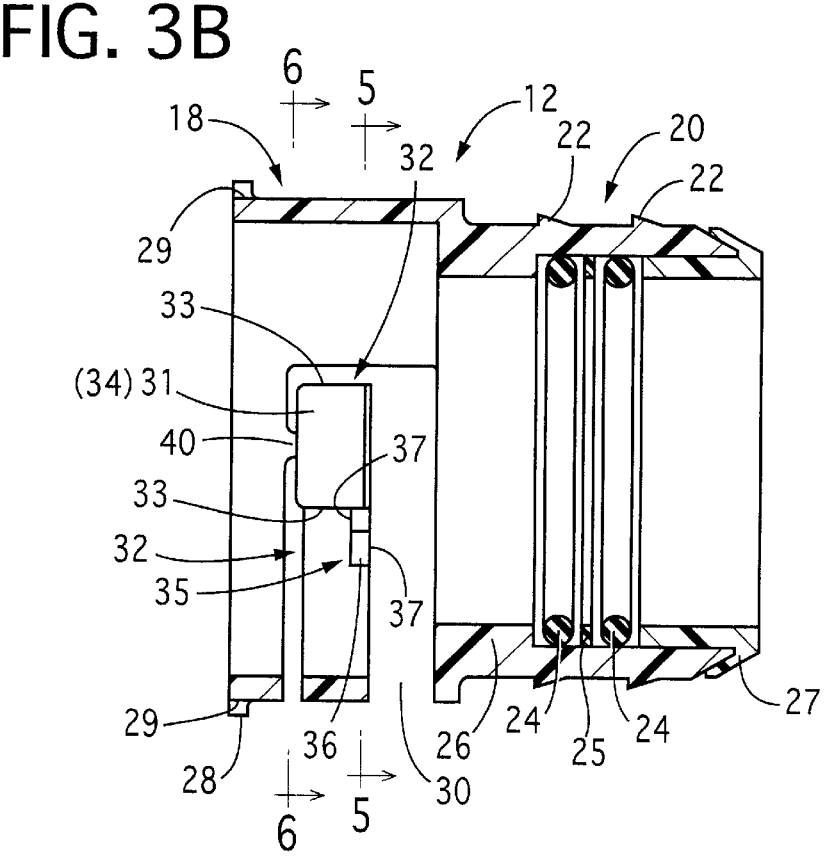
FIG. 3B is a front elevational view in cross section of the female.
Figure 4A:
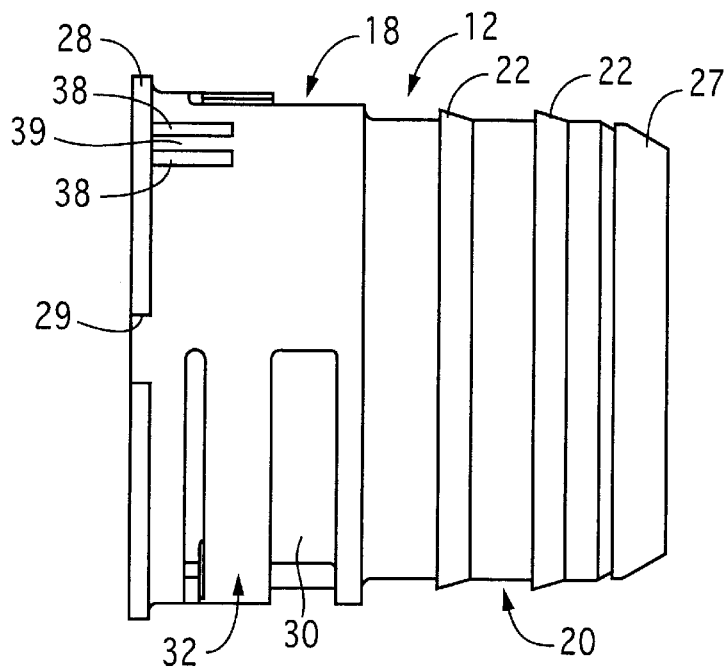
FIG. 4A is a plan view of the female connector.
Figure 4B:
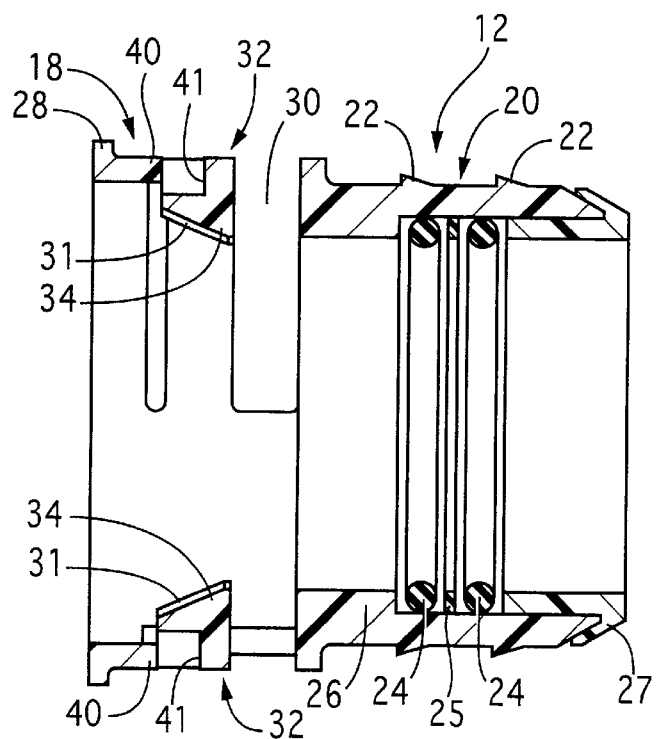
FIG. 4B is a plan view in cross section of the female connector.

As shown in FIGS. 1 and 4B, each of the two latching arms 32, 32 formed with the cylindrical wall of the large-diameter cylindrical portion 18 has a latching projection 34 formed on its free end portion such that the latching projection 34 projects in the radially inward direction from its inner surface. This latching projection 34 has a ramp surface 31 facing in the radially inward direction of the cylindrical portion 18. This ramp surface 31 is formed so as to elastically deform or displace the latching arm 32 in the radially outward direction of the cylindrical portion 18 when the pipe 18 is inserted into the female connector 12, with the annular protrusion 16 in sliding contact with the ramp surface 31. As shown in FIGS. 1 and 3B, the latching projection 34 has opposed end faces 33, 33 which define a circumferential dimension of the latching projection 34 in the circumferential direction of the cylindrical portion 18 in which the latching arm 32 extends.

Figure 5:
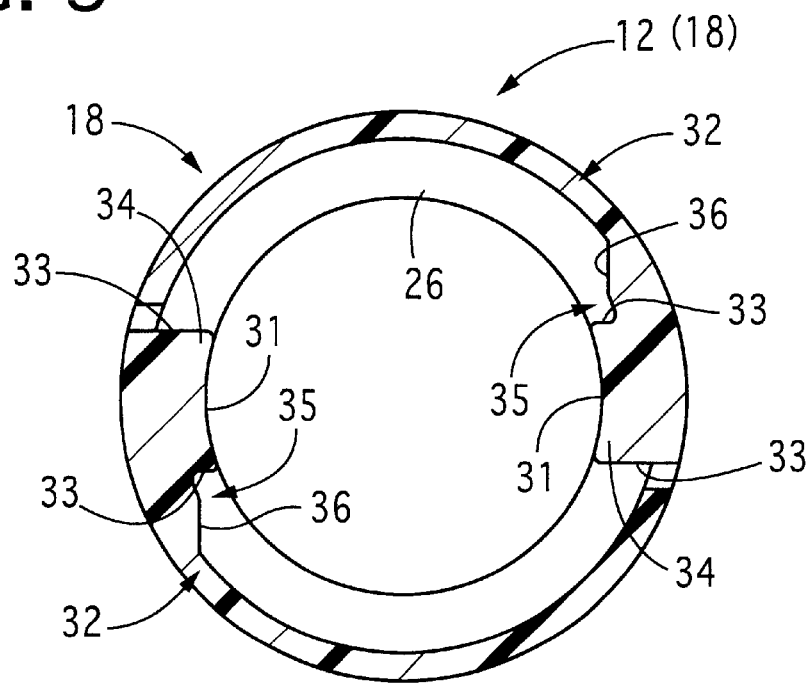
FIG. 5 is a cross sectional view taken along line 5—5 of FIG. 3B.

As is apparent from FIGS. 1, 3B and 5, an engaging protrusion 35 is formed integrally with each of the latching projections 34 formed at the free end portion of the respective latching arms 32. The engaging protrusion 35 is formed so as to extend from the inner surface of the latching arm 32 in the radially inward direction of the cylindrical portion 18. This engaging protrusion 35 is located at one lateral end of the latching arm 32, which lateral end corresponds to one of opposite ends of the latching projection 34 as seen in the axial direction of the cylindrical portion 18, at which the latching projection 34 has the largest amount of radially inward protrusion, that is, located at the front end of the latching arm 32 as seen in the direction of insertion of the pipe 10 into the female connector 12, that is, at the right-hand side end of the latching arm 32 as seen in FIG. 1. As shown in FIG. 1, the engaging protrusion 35 extends from one of the opposite end faces 33 of the latching protrusion 34 in the circumferential direction of the cylindrical portion 18. As shown in FIG. 5, the engaging protrusion 35 has a radially inner inclined cam surface 36 which extends in the circumferential direction of the cylindrical portion 18 and which is inclined such that the radial position of the inclined cam surface 36 gradually changes from the radially inner surface of the latching arm 32 to the radially inner surface of the latching projection 34 as the inclined cam surface 36 extends in the circumferential direction of the cylindrical portion 18 in which the latching arm 32 extends. As shown in FIG. 3B, the engaging protrusion 35 has two engaging surfaces 37 which are opposed to each other in the axial direction of the cylindrical portion 18 (in the direction of insertion of the pipe 10) and which are to be held in contact with corresponding surfaces of a receptacle 60 (which will be described) formed in the latching indicator member 14, before the pipe 10 has been inserted into the female connector 12.

Figure 3A:
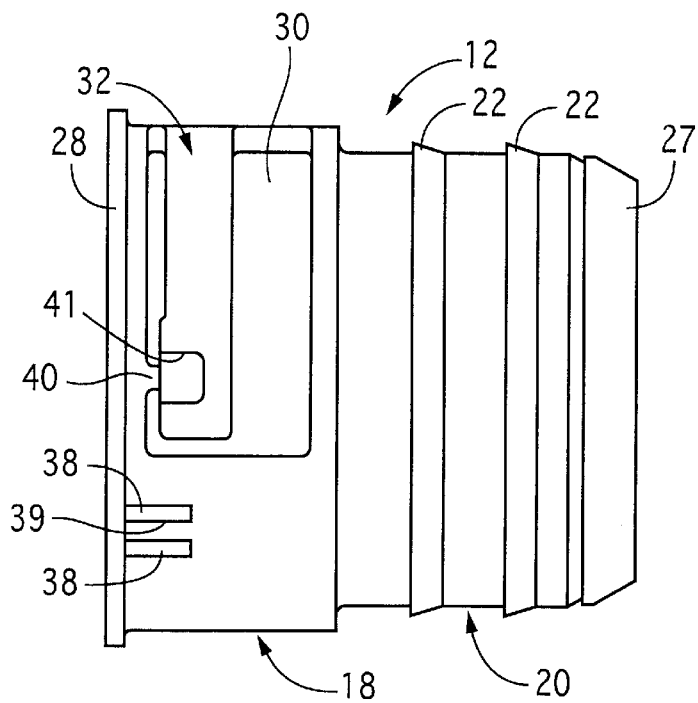
FIG. 3A is a front elevational view of a female connector of the quick-action connector assembly of FIG. 1.
Figure 6:
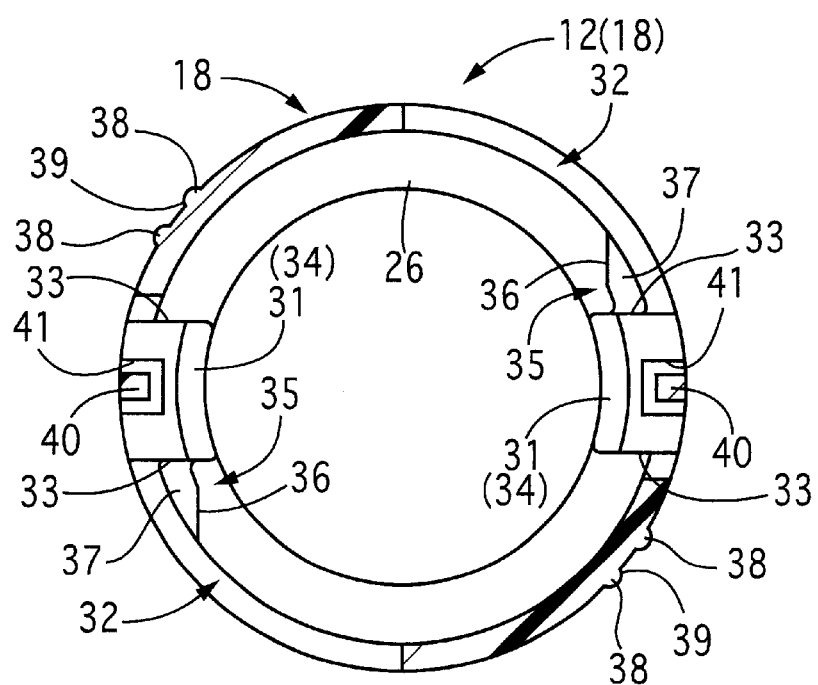
FIG. 6 is a cross sectional view taken along line 6—6 of FIG. 3B.

As shown in FIGS. 3A, 4A and 6, the large-diameter cylindrical portion 18 having the two latching arms 32, 32 has two axial projections 38, 38 formed on the outer circumferential surface of its axial end section on the side of the outward flange 28, such that the two axial projections 38, 38 extend in the axial direction of the cylindrical portion 18 and such that each axial projection 38 has a generally arcuate cross sectional shape and a relatively small height in the radial direction of the cylindrical portion 18. The two axial projections 38, 38 cooperate to define an axially extending positioning recess 39 therebetween.

As shown in FIGS. 3A and 4B, the large-diameter cylindrical portion 18 of the female connector 12 includes a disengagement-preventive protuberance 40 extending into one of the above-indicated two arms of each U-shaped slot 30 which is located on the rear side of the latching arm 32 as seen in the direction of insertion of the pipe 10 into the large-diameter portion 18, namely, into the arm (hereinafter referred to as "second arm") of the U-shaped slot 30 which has a smaller dimension as measured in the axial direction of the cylindrical portion 18 than the first arm. In other words, the disengagement-preventive protuberance 40 is formed so as to extend toward one of the opposite lateral surfaces of the corresponding latching arm 32 which is remote from the small-diameter cylindrical portion 20. The latching projection 34 of each latching arm 32 has an engaging recess 41 in its lateral surface corresponding to the above-indicated one lateral surface of the latching torque 32. The engaging recess 41 is formed for engagement with the disengagement-preventive protuberance 40, to prevent an excessively large amount of elastic deformation of the latching arm 32 in the radially outward direction of the cylindrical portion 18.

In the present quick-action connector assembly including the pipe 10 and the female connector 12 which are constructed as described above, the latching indicator member 14 is fitted substantially within the female connector 12, as described above. As shown in FIGS. 7–10, this latching indicator member 14 is a generally cylindrical member, which is formed of a resin material, like the female connector 12.

Described in greater detail, the latching indicator member 14 has an outside diameter smaller than the inside diameter of the large-diameter cylindrical portion 18 of the female connector 12, an inside diameter larger than the outside diameter of the annular protrusion 16 of the pipe 10 to be inserted into the cylindrical portion 18, and an axial length smaller than that of the cylindrical portion 18 by a suitable amount. According to this arrangement, the latching indicator member 14 fitted in the large-diameter cylindrical portion 18 is axially movable relative to the cylindrical portion 18 toward and away from the small-diameter cylindrical portion 20, and the pipe 10 can be inserted through a bore of the latching indicator member 14, as indicated in FIGS. 1 and 16.

Figure 8:
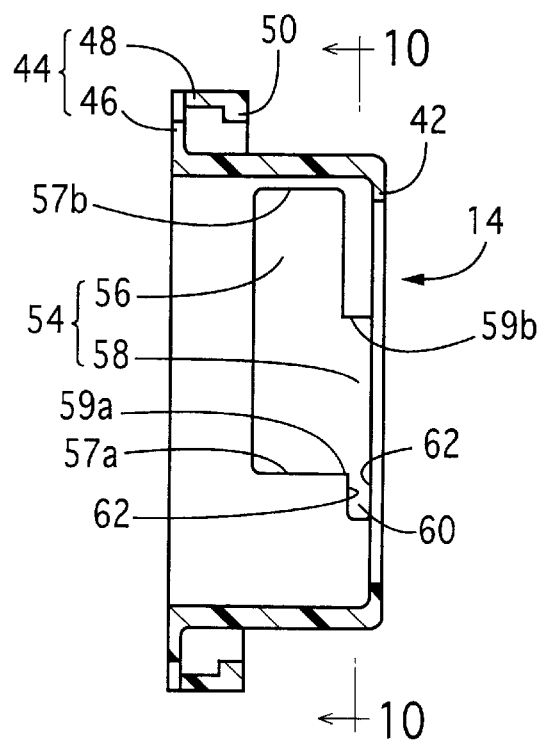
FIG. 8 is a view in axial cross section of the latching indicator member of FIG. 7.

The latching indicator member 14 has an integrally formed engaging inward flange 42 formed at one of its axially opposite ends, so as to extend in the radially inward direction, as shown in FIG. 8. The engaging inward flange 42 has an inside diameter which is larger than the outside diameter of the engaging end portion 15 of the pipe 10 but is smaller than the outside diameter of the annular protrusion 16, so that the engaging end portion 15 is movable through the engaging inward flange 42, but the annular protrusion 16 is not movable through the engaging inward flange 42. Accordingly, the pipe 10 can be inserted into the female connector 12 until the annular protrusion 16 is brought into abutting contact with an inner annular surface of the engaging inward flange 42, as indicated by, two-dot chain line in FIG. 1.

Figure 7:
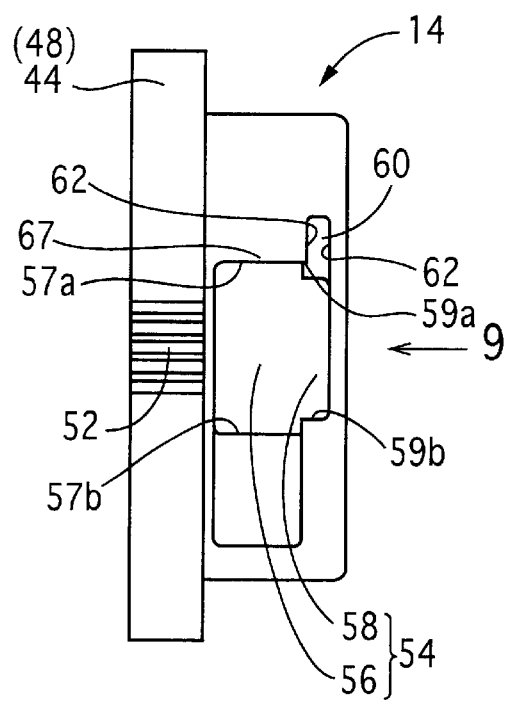
FIG. 7 is a front elevational view of a latching indicator member included in the quick-action connector assembly of FIG. 1.
Figure 9:
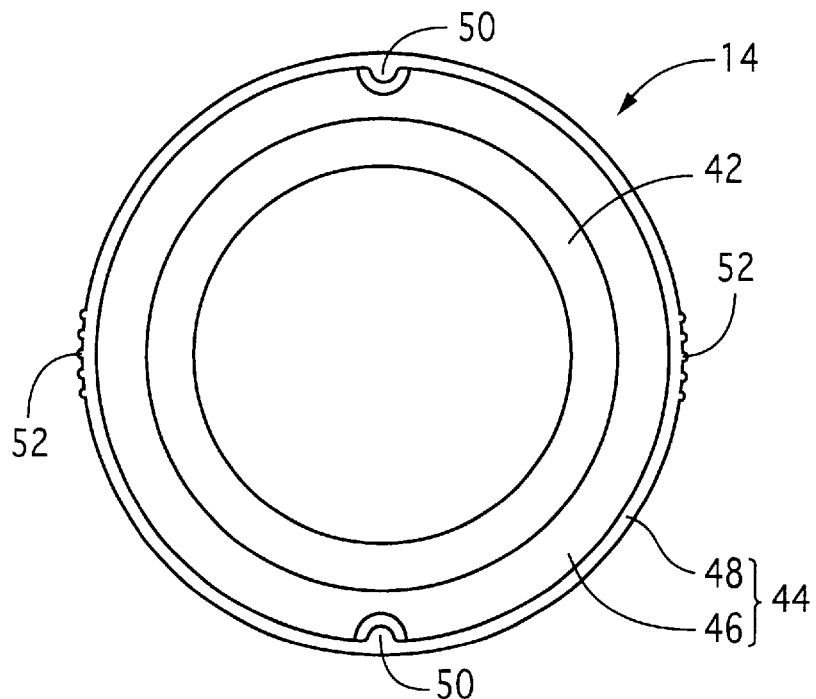
FIG. 9 is a view taken in a direction indicated by arrow 9 of FIG. 7.
Figure 10:
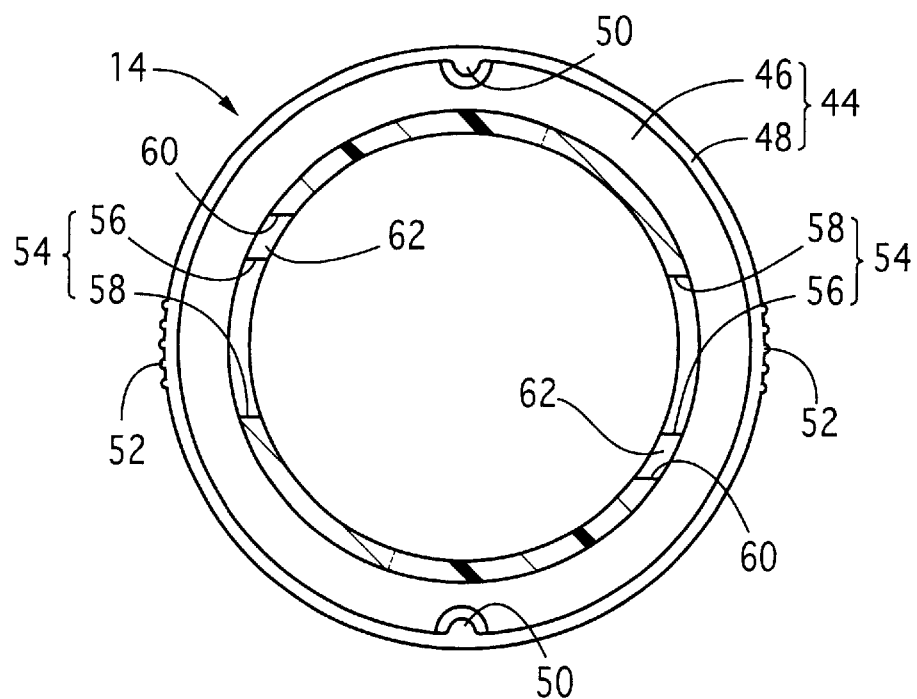
FIG. 10 is a cross sectional view taken along line 10—10 of FIG. 8.

The latching indicator member 14 further has an integrally formed L-shaped outward flange 44 formed at the other axial end remote from the engaging inward flange 42. As shown in FIG. 8, the outward flange 44 is L-shaped in cross section. That is, the L-shaped outward flange 44 consists of an annular portion 46 extending from the above-identified axial end in the radially outward direction of the latching indicator member 14, and a cylindrical portion 48 which extends from the radially outer end of the annular portion 46 in the axial direction of the latching indicator member 14 toward the engaging inward flange 42. The cylindrical portion 48 has an axial dimension considerably smaller than that of the latching indicator member 14. As shown in FIGS. 8–10, the L-shaped outward flange 44 has integrally formed two positioning protrusions 50 formed at the free axial end of the cylindrical portion 48, at respective two diametrically opposed circumferential positions of the cylindrical portion 48, such that the positioning protrusions 50 extend in the radially inward direction from the inner circumferential surface of the cylindrical portion 48, by a relatively small radial distance. As shown in FIGS. 9 and 10, each positioning protrusion 50 has a generally arcuate cross sectional shape. As shown in FIGS. 7, 9 and 10, the cylindrical portion 48 has two sets of slip-preventive portions 52 each set consisting of a plurality of parallel axial projections formed on its outer surface so as to extend in its axial direction. The two sets of slip-preventive portions 52 are located at respective two circumferential positions of the cylindrical portion 48 which are opposed to each other in a diametric direction perpendicular to the diametric direction in which the two positioning protrusions 50 are opposed to each other.

The latching indicator member 14 further has two openings 54 formed through respective two diametrically opposed circumferential portions of its cylindrical wall. Each of the two openings 54 is formed in an axial portion of the cylindrical wall of the latching indicator member 14, which is located between an axially intermediate part and the axial end at which the engaging inward flange 42 is formed. The openings 54 are formed such that the dimension as measured in the circumferential direction of the latching indicator member 14 is larger at a first axial portion thereof relatively near the above-indicated axially intermediate part than at a second axial portion near the axial end on the side of the engaging inward flange 42, as indicated in FIG. 8.

Figure 15:
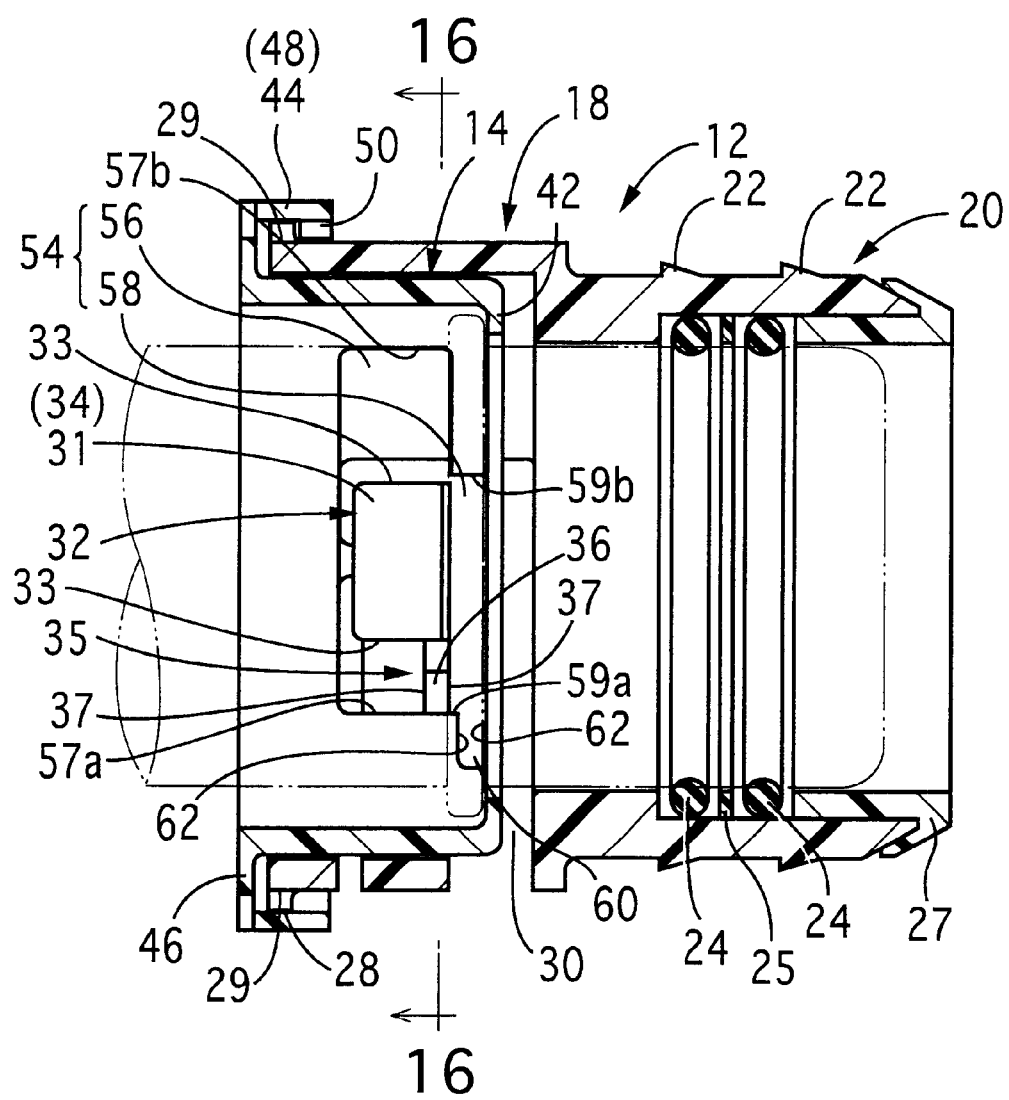
FIG. 15 is a cross sectional view taken along line 15—15 of FIG. 14.

Described more specifically, each opening 54 consists of a wide portion 56 and a narrow portion 58 which correspond to the first and second axial portions indicated above. The wide portion 56 has a circumferential dimension which is at least two times larger than the circumferential dimension of the latching projection 34 of the corresponding latching arm 32 of the large-diameter cylindrical portion 18 of the female connector 12. On the other hand, the narrow portion 58 has a circumferential dimension which is considerably smaller than that of the wide portion 56 and slightly larger than that of the latching projection 34. In other words, a distance between opposed surfaces 57a, 57b of the wide portion 56 which are opposed to each other in the circumferential direction of the latching indicator member 14 is considerably larger than a distance between the end faces 33, 33 of the latching projection 34 opposed to each other in the circumferential direction of the cylindrical portion 18, while a distance between opposed surfaces 59a, 59b of the narrow portion 58 which are opposed to each other in the circumferential direction is only slightly larger than a distance between the end faces 33, 33. Further, the axial dimension of the wide portion 56 as measured in the axial direction of the cylindrical portion 18 is slightly larger than that of the latching projection 34, while the axial dimension of the narrow portion 56 is considerably smaller than that of the latching projection 34. Accordingly, the entirety of the latching projection 34 can be accommodated within the wide portion 56, but only a part of the latching projection 34 can be accommodated within the narrow portion 58, as indicated in FIGS. 1 and 15.

The latching indicator member 14 further has the receptacle 60 referred to above in connection with the engaging protrusion 35 of the latching arm 32. The receptacle 60 is formed by cutting one of the opposed surfaces 59a, 59b, that is, by cutting the surface 59b in the circumferential direction of the latching indicator member 14. The axial dimension of the receptacle 60 as measured in the axial direction of the latching indicator member 14, that is, a distance between opposed surfaces 62, 62 of the receptacle 60 which are opposed in the axial direction is made slightly larger than the axial dimension of the engaging protrusion 35 of the latching arm 32, that is, slight larger than a distance between the engaging surfaces 37, 37 of the engaging protrusion 35 which are opposed to each other in the axial direction. Accordingly, the engaging protrusion 35 can be inserted into the receptacle.

In the quick-action connector assembly according to the present embodiment, the latching indicator member 14 is fitted substantially within the female connector 12, prior to the insertion of the pipe 10 into the female connector 12, such that the axial end portion of the latching indicator member 14 on the side of the engaging inward flange 42 is received in the large-diameter cylindrical portion 18 while the other axial end portion on the side of the L-shaped outward flange 44 is located outside the cylindrical portion 18. In this state of engagement of the latching indicator member 14 and the large-diameter cylindrical portion 18, the latching projections 34 of the latching arms 32 formed on the cylindrical portion 18 are fitted within the respective openings 54 such that an axial portion of each latching projection 34 is located within the wide portion 56 while the other axial portion of the latching projection 34 is located within the narrow portion 58, and such that the engaging protrusion 35 formed adjacent to the latching projection 34 is held in engagement with the receptacle 60.

In the above-described state of engagement of the latching indicator member 14 with the female connector 12 prior to the insertion of the pipe 10 into the female connector 12, the latching indicator member 14 is prevented from moving relative to the female connector 12 in the axial direction, by the engaging protrusions 35 whose axially opposed surfaces 37, 37 are held in engagement with the respective axially opposed surfaces 62, 62 of the receptacles 60. Further, the latching indicator member 14 is substantially prevented from rotating relative to the female connector 13, by the latching projections 34 whose circumferentially opposed end faces 33, 33 are held in engagement with the respective circumferentially opposed surfaces 59a, 59b of the narrow portions 58 of the openings 54.

Since the circumferential dimension of the narrow portions 58 of the openings 54 is slightly larger than that of the latching projections 34, the rotation of the latching indicator member 14 relative to the female connector 12 is permitted by a small angle even with the latching projections 34 held in engagement with the narrow portions 58 of the openings 54. However, the relative rotation of the latching indicator member 14 and the female connector 12 may be completely inhibited by forming the latching projections 34 and the narrow portions 58 with the substantially the same circumferential dimension. It is noted that the L-shaped outward flange 44 of the latching indicator member 14 can be fitted on the corresponding axial end part of the large-diameter cylindrical portion 18 of the female connector 12, by moving the latching indicator member 14 in the axial direction relative to the female connector 12 while the two positioning protrusions 50 of the L-shaped outward flange 44 are held in the respective grooves 29 formed in the outward flange 28 of the cylindrical portion 18.

To connect the pipe 10 and the female connector 10 of the present quick-action connector assembly constructed as described above, the pipe 10 is first inserted into the female connector 12 until the annular protrusion 16 formed on the engaging end portion 15 is brought into abutting contact with the inner annular surface of the engaging inward flange 42 of the latching indicator member 14 fitted substantially within the large-diameter cylindrical portion 18.

Figure 11:
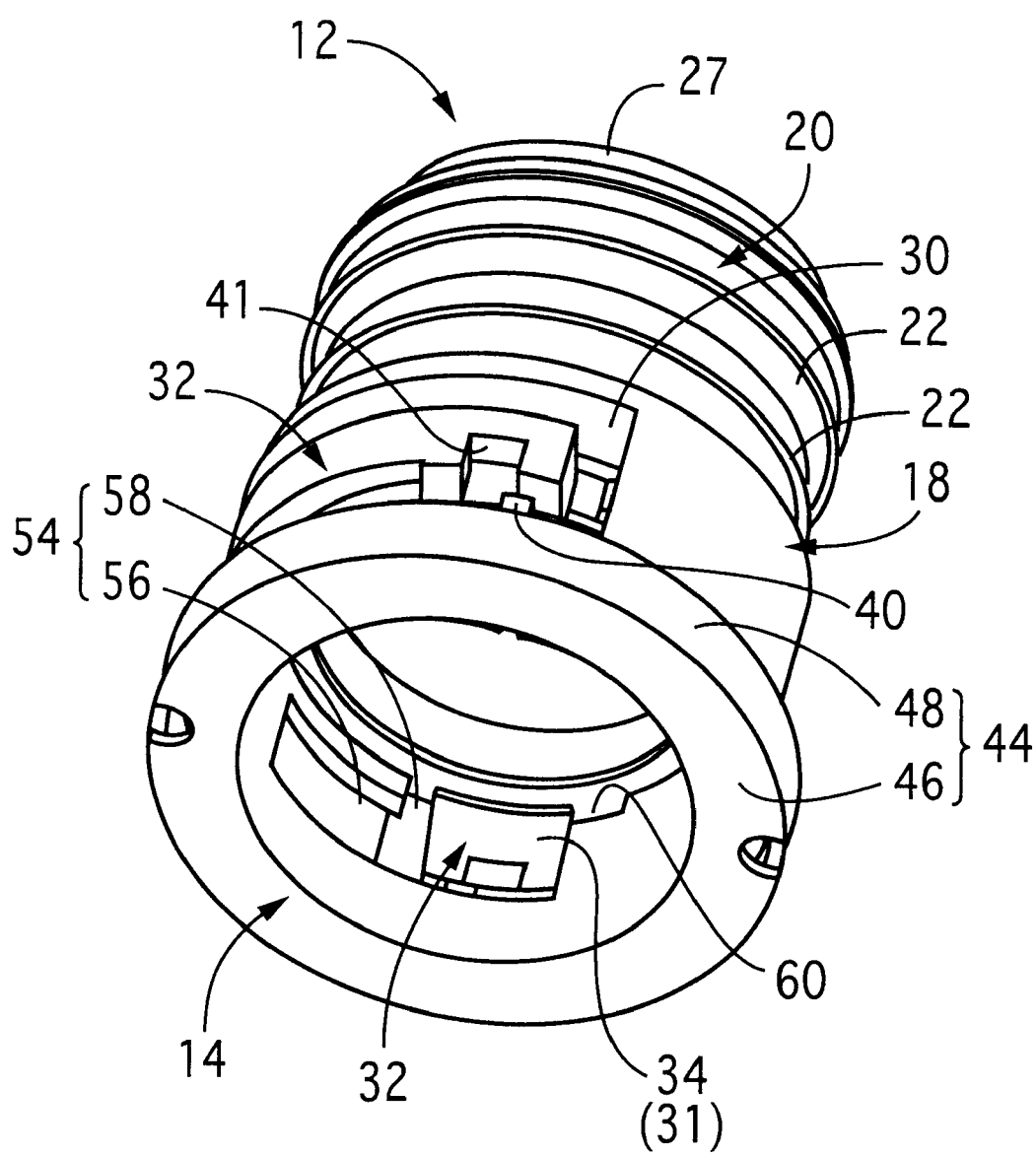
FIG. 11 is a perspective view showing the female connector and the latching indicator member of the quick-action connector assembly of FIG. 1, in the process of insertion of a pipe into the female connector, with omission of showing of the pipe from the figure to show the interior of the female connector.
Figure 12:
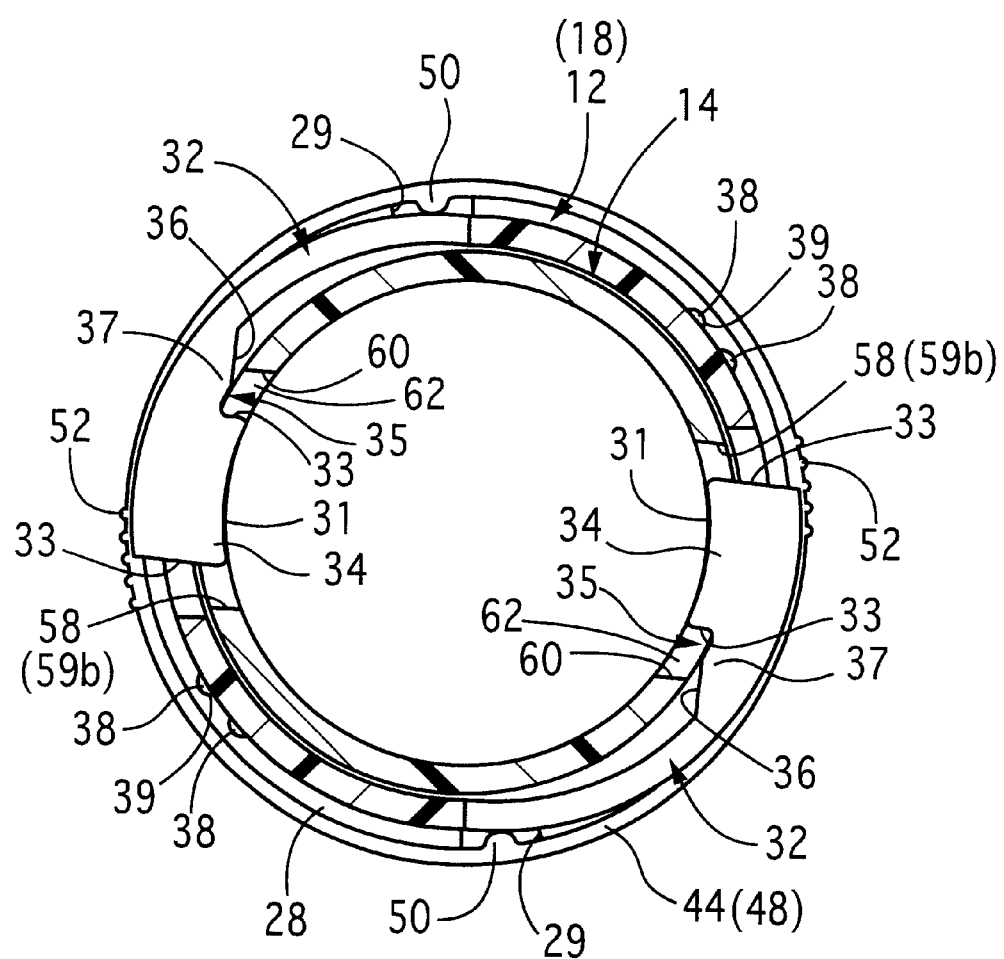
FIG. 12 is a view in axial cross section corresponding to that of FIG. 2, showing the female connector and the latching indicator member in a state of use of FIG. 11.

During the axial advancing movement of the pipe 10 into the large-diameter cylindrical portion 18 of the female connector 12 until the annular protrusion 16 of the pipe 10 has come into contact with the inner annular surface of the engaging inward flange 42 of the latching indicator member 14, the annular protrusion 16 is advanced in sliding contact with the ramp surfaces 31 of the latching projections 34 of the two latching arms 32 of the female connector 12, so that the two latching arms 32 are elastically deformed or displaced in the radially outward direction of the female connector 12, as shown in FIGS. 11 and 12, whereby the latching projections 34 are moved out of the respective openings 54 of the cylindrical portion 18 while at the same time the engaging protrusions 35 also formed on the latching arms 32 are moved out of the respective receptacles 60, with the opposed engaging surfaces 36, 37 of the engaging protrusions 35 being disengaged from the respective opposed surfaces 62, 62 of the receptacles 60. As a result, an axial movement of the latching indicator member 14 relative to the female connector 12 is permitted. It will be understood that the engaging protrusions 35 of the female connector 12 and the receptacles 60 of the latching indicator member 14 cooperate to constitute third engaging means for preventing an axial movement of the latching indicator member 14 relative to the female member in the form of the female connector 12 before the male member in the form of the pipe 10 has not been inserted into the cylindrical portions 18, 20 of the male member 12. It is to be understood that the pipe 10 to be inserted into the female connector 12 is not shown in FIGS. 11 and 12, and FIGS. 13–15, 17 and 18 (to which a reference will be made), to show the movements of the latching projections 34 and engaging protrusions 35 of the latching arms 32 when the pipe 10 is inserted into the female connector 12.

Then, the pipe 10 is further advanced into the large-diameter portion 18 of the female connector 12 after the annular protrusion 16 of the pipe 10 has been brought into abutting contact with the inner annular surface of the engaging inward flange 42 of the latching indicator member 14. With this further advancing movement of the pipe 10, the latching indicator member 14 is advanced with the annular protrusion 16 of the pipe 10 held in pressing contact with the engaging inward flange 42. Thus, the annular protrusion 16 of the pipe 10 and the engaging inward flange 42 of the latching indicator member 14 cooperate to constitute first engaging means for moving the latching indicator member 14 together with the female member in the form of the pipe 10 in the axial direction.

Figure 13:
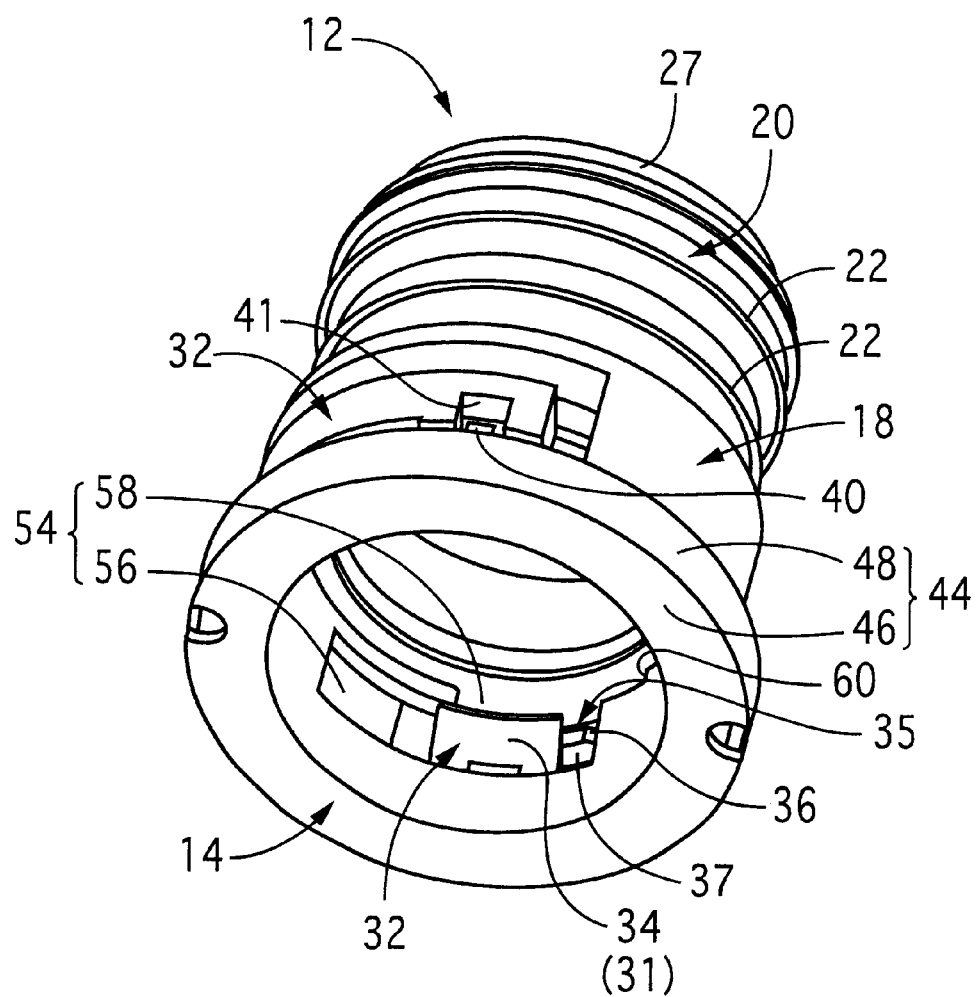
FIG. 13 is a perspective view of the quick-action connector assembly of FIG. 1, with omission of showing of the pipe, after the pipe has been inserted for latching connection with the female connector, with engagement of latching projections of latching arms of the female connector with an annular protrusion of the pipe.
Figure 14:
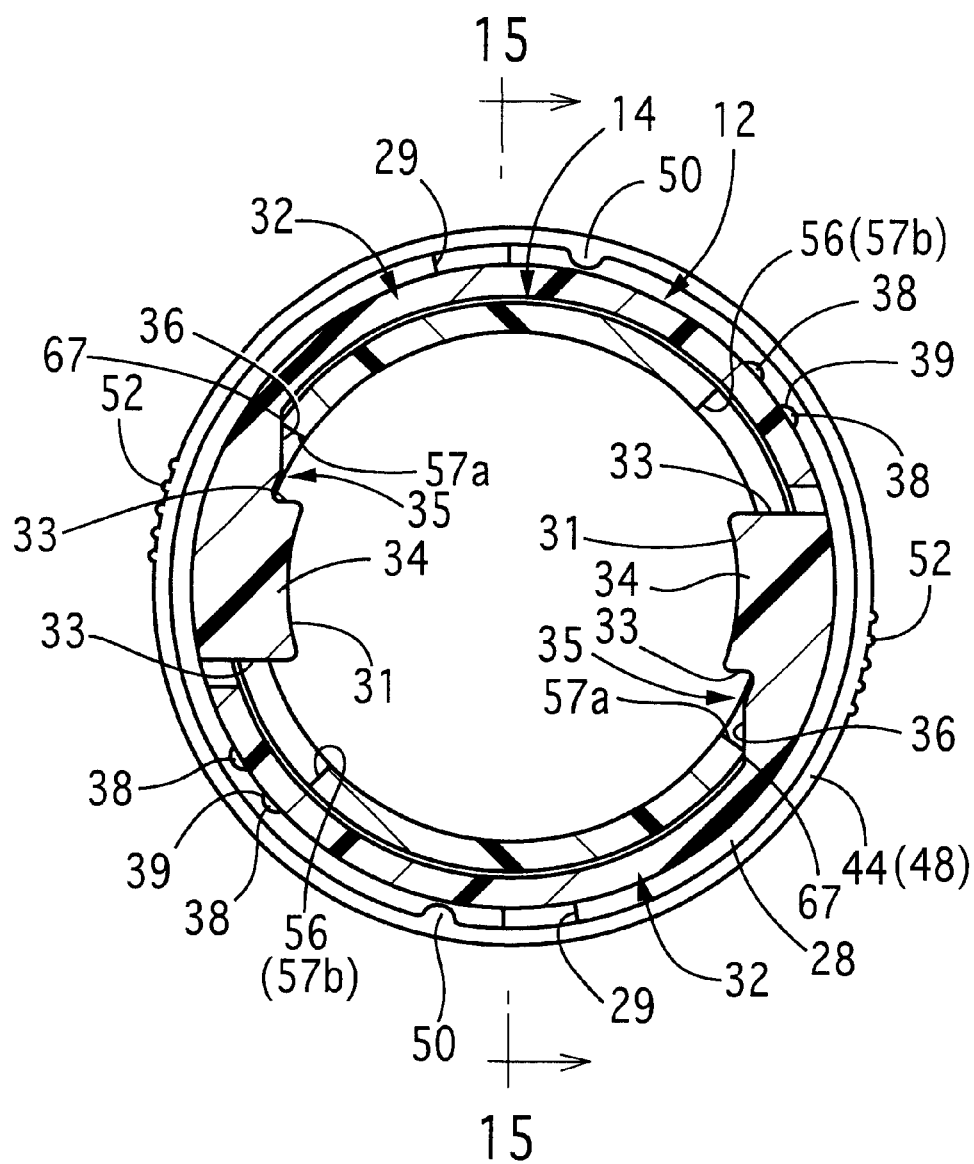
FIG. 14 is a view in axial cross section taken along line 14—14 of FIG. 15, showing the quick-action connector assembly in a state of use of FIG. 13.

The pipe 10 is advanced until the front end of the engaging end portion 15 is moved into the small-diameter cylindrical portion 20 of the female connector 12, with the elastic deformation or displacement of each latching arm 32 in the radially outward direction of the female member 12, which deformation permits the annular protrusion 16 to clear the latching projection 34 and to be received within the above-indicated first arm of the U-shaped slot 30 having a larger axial direction than the second arm, as shown in FIGS. 13–15. The pipe 10 is advanced until the first arm, and the pipe 10 is advanced until the latching projection 34 and the engaging protrusion 35 of each latching arm 32 to be received within the wide portion 56 of the opening 54, as shown in FIG. 15, with radially inward deformation or displacement of the latching arm 32, so that the annular protrusion 16 of the pipe 10 is latched in engagement with the latching projection 34, as shown in FIG. 16.

The movement of the latching projection 34 of each latching arm 32 from the narrow portion 58 of the opening 54 into the wide portion 56 results in disengagement of the circumferentially opposed end faces 33 of the latching projection 34 from the circumferentially opposed surfaces 59a, 59b of the narrow portion 58, as also shown in FIG. 15.

The annular protrusion 16 held latched in engagement with the latching projections 34 prevents or inhibits a retracting movement of the pipe 10, that is, a movement of the pipe 10 in the axial direction that causes the pipe 10 to be removed from the large-diameter cylindrical portion 18 of the female connector 12. In this latched state of the pipe 10 with respect to the female connector 12, rotation of the latching indicator member 14 relative to the female connector 12 is permitted since the end faces 33 of the latching projections 34 have been disengaged from the opposed surfaces 59a, 59b of the narrow portions 58 of the openings 54. A maximum angle of rotation of the latching indicator member 14 relative to the female connector 12 is determined by abutting contact of the end faces 33 of the latching projections 34 with the opposed surfaces 57a, 57b of the wide portions 56 of the openings 54, that is, determined by the circumferential dimension of the wide portions 56 as measured in the circumferential direction of the latching indicator member 14. It will be understood that the latching projection 34 of each latching arm 32 and the corresponding opening 54 cooperate to constitute second engaging means for inhibiting and permitting rotation of the latching indicator member 14 relative to the female member in the form of the female connector 12, depending upon whether the male member in the form of the pipe 10 has been inserted into the cylindrical portions 18, 20 of the female member 12.

Figure 17:
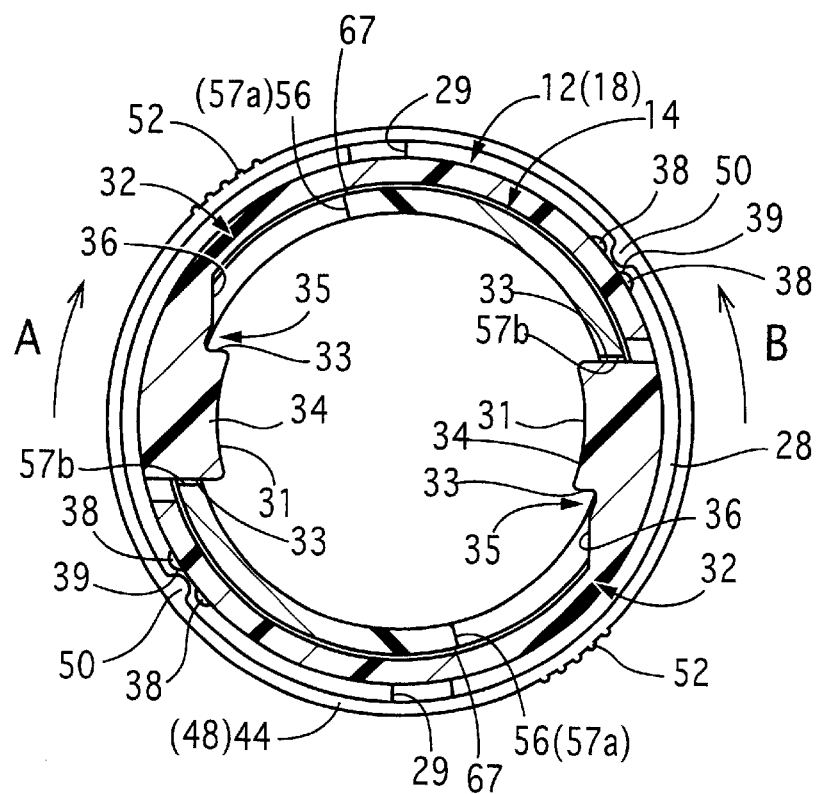
FIG. 17 is a cross sectional view showing the quick-action connector assembly of FIG. 1 in another state of use after the latching indicator member is rotated to a predetermined angular position relative to the female connector while the pipe and the female connector are held in the mutually latched state.

After the pipe 10 has been connected to the female connector 12 as described above, the latching indicator member 14 is rotated relative to the female connector 12 in a clockwise direction as indicated by arrow A in FIG. 17, until the positioning protrusions 50 provided on the L-shaped outward flange 44 of the latching indicator member 14 are brought into engagement with the axial positioning recesses 39 formed on the outer circumferential surface of the large-diameter cylindrical portion 10 of the female connector 12, so that the latching indicator member 14 is prevented from freely rotating relative to the female connector 12. It will be understood that an angular position of the latching indicator member 14 in which the positioning protrusions 50 are held in engagement with the axial positioning recesses 39 is different from an angular position (FIG. 2) of the latching indicator member 14 before the pipe 10 has been inserted into and connected to the female connector 12. A change of the angular position of the latching indicator member 14 can be visually recognized by a change of the angular position of the slip-preventive portions 52 formed on the outer circumferential surface of the L-shaped outward flange 44 of the latching indicator member 14. It will be understood that the positioning protrusions 50 and the axial positioning recesses 39 cooperate to constitute a locking mechanism operable to prevent free rotation of the latching indicator member 14 relative to the female member while this relative rotation is permitted by the second engaging means.

Figure 18:
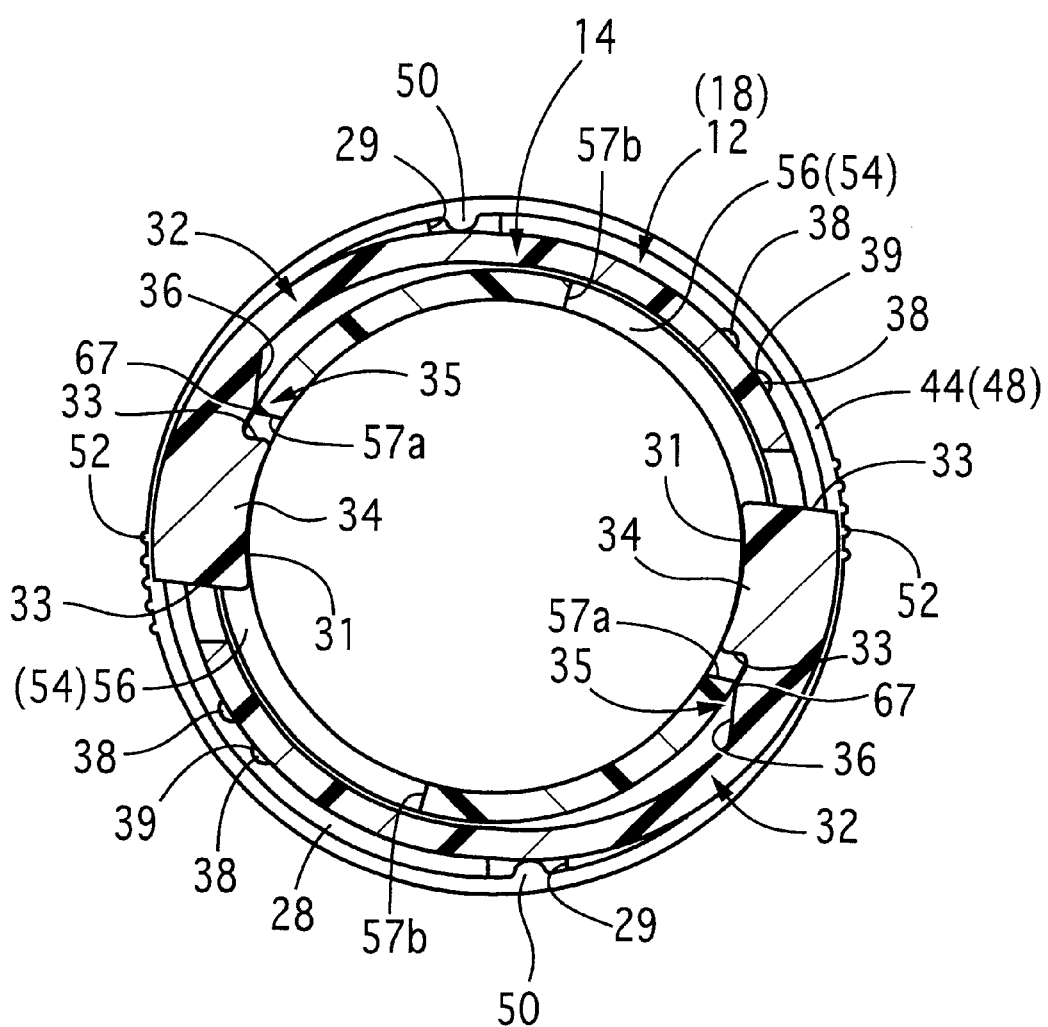
FIG. 18 is a cross sectional view showing the quick-action connector assembly of FIG. 1 in a further state of use after the latching projections of the latching arms of the female connector have been disengaged from the annular protrusion of the pipe, by rotating the latching indicator member.

In the quick-action connector assembly of the present embodiment constructed as described above, each of the latching arms 32, 32 is deformed or displaced in the radially outward direction of the cylindrical portion 18, by rotating the latching indicator member 14 relative to the female connector 12 in a counterclockwise direction indicated by arrow B in FIG. 17, from the angular position of FIG. 17 in which the positioning protrusions 50 are held in engagement with the axial positioning recesses 39, to an angular position of FIG. 18 in which the positioning protrusions 50 are disengaged from the axial positioning recesses 39. This rotation of the latching indicator member 14 relative to the female connector 12 causes a sliding movement of an outer edge 67 of the surface 57a of the wide portion 56 of each opening 54 on the inclined cam surface 36 of the engaging protrusion 35 of the corresponding latching arm 32. The surface 57a is one of the opposed surfaces 57l, 57b of the wide portion 56 which is located downstream of the latching projection 34 as viewed in the rotating direction indicated by the arrow B. As a result of the radially outward deformation or displacement of each latching arm 32 caused by the sliding movement of the outer edge 67 on the inclined cam surface 36, the latching projection 34 of each latching arm 32 is moved out of the opening 54 so that the annular protrusion 16 of the pipe 10 is released from the latching projection 34, whereby the pipe 10 can be axially moved relative to and removed from the female connector 12. It will be understood that the outer edge 67 of the surface 57a of the wide portion 56 of each opening 54 formed through the latching indicator member 14 serves as a slidably contacting portion provided for a sliding movement on the inclined cam surface 36 of the engaging protrusion 35 of each latching projection 34.

In the quick-action connector assembly according to the present embodiment of the invention, the rotation of the latching indicator member 14 relative to the female connector 12 is inhibited before the pipe 10 has not been inserted into the female connector 12. After the pipe 10 has been connected to the female connector 12 with the annular protrusion 16 latched in engagement with the latching projections 34 of the latching arms 32, the rotation of the latching indicator member 14 relative to the female connector 12 is permitted. Thus, it is possible to check if the pipe 10 has been completely connected to the female connector 12 or not, by simply determining whether the latching indicator member 14 can be rotated relative to the female connector 12 (by an angle corresponding to the circumferential dimension of the wide portions 56 of the openings 54) or not. This checking or determination is possible with the latching indicator member 14 held fitted in the female connector 12, that is, without removal of the latching indicator member 14 from the female connector 12.

Accordingly, the present quick-action connector assembly can be accurately and easily checked for complete connection of the pipe 10 and the female connector 12, by merely checking if the latching indicator member 14 can be rotated relative to the female connector 12, each time an operation to connect the pipe 10 and the female connector 12 is performed, even where the operations to connect and disconnect the pipe 10 and the female connector 12 to and from each other are repeatedly performed.

The present quick-action connector assembly is further arranged to inhibit an axial movement of the latching indicator member 14 relative to the female connector 12, prior to the insertion of the pipe 10 into the female connector 12, since with the engaging protrusions 35 of the latching arms 32 of the female connector 12 are held in engagement with the respective receptacles 60 of the latching indicator member 14 before the pipe 10 has been inserted into the female connector 12. The quick-action connector assembly is further arranged to permit an axial movement of the latching indicator member 12 relative to the female connector 12 after the insertion of the pipe 10 into the female connector 12 since the insertion of the pipe 10 causes the annular protrusion 16 to elastically displace the latching arms 32 in the radially outward direction of the cylindrical portion 18, thereby moving the engaging protrusions 35 out of the receptacles 60. This arrangement is effective to prevent an axial movement of the latching indicator member 14 in the direction of insertion of the pipe 10 into the female connector 12 before the insertion of the pipe 10 into the female connector 12, and an axial movement of the latching indicator member 14 to the position permitting the rotation of the latching indicator member relative to the female connector 12, before the annular protrusion 18 of the pipe 18 has been latched by the latching projections 34 of the latching arms 32. Accordingly, the present arrangement assures a further improvement in the accuracy of checking as to whether the pipe 10 and the female connector 12 have been completely connected to each other, depending upon whether the latching indicator member 14 can be rotated relative to the female connector 12 or not.

In addition, the present embodiment is arranged such that free rotation of the latching indicator member 14 relative to the female connector 12 after the connection of the pipe 10 and the female connector 12 to each other is prevented by engagement of the positioning protrusions 50 of the latching indicator member 14 with the axial positioning recesses 39 of the female connector 12. This engagement is effected by rotating the latching indicator member 14 relative to the female connector 12 after the connection of the pipe 10 and the female connector 12 to each other, so that undesirable rotation of the latching indicator member 14 after the connection is prevented.

The present embodiment is also arranged such that the angular position of the latching indicator member 14 in which the positioning protrusions 50 are held in engagement with the positioning recesses 39 can be recognized by visual inspection of the angular position of the externally visible slip-preventive portions 52 of the latching indicator member 14, so that the checking as to whether the pipe 10 and the female connector 12 have been completely connected to each other can be easily and efficiently achieved by simple visual checking of the angular position of the slip-preventive portions 52, without having to determine whether the latching indicator member 14 can be rotated relative to the female connector 12.

The present quick-action connector assembly is further arranged such that each of the latching arms 32, 32 is deformed or displaced in the radially outward direction of the cylindrical portion 18, by rotating the latching indicator member 14 relative to the female connector 12 in the direction opposite to the direction of rotation that causes engagement of the positioning protrusions 50 with the positioning recesses 39, so that the outer edge 67 of the surface 57a of the wide portion 56 of the opening 54 of the latching indicator member 14 is slidably moved on the inclined cam surface 36 of the engaging protrusion 35 of the corresponding latching arm 32. As described above, the surface 57a is one of the opposed surfaces 571, 57b of the wide portion 56 which is located downstream of the latching projection 34 as viewed in the rotating direction of the latching indicator member 14. As a result of the radially outward deformation or displacement of each latching arm 32, the latching of the annular protrusion 16 of the pipe 10 by the latching projection 34 of each latching arm 32 is released, whereby the pipe 10 can be removed from the female connector 12. Thus, the pipe 10 and the female connector 12 can be disconnected from each other by simply rotating the latching indicator member 12 in the predetermined relation, without using a jig or any other exclusive device for releasing the latching between the annular protrusion 16 of the pipe 10 and the latching arms 32 of the female connector 12. Thus, the present quick-action connector assembly has an accordingly improved ease of operation.

Further, the latching indicator member 14 used in the present quick-action connector assembly is not removed from the female connector 12 after the pipe 10 and the female connector 12 have been connected to each other. Therefore, the present connector assembly does not require the latching indicator member 14 to be discarded, so that unnecessary wasting of the material is advantageously minimized.

In addition, the present quick-action connector assembly is arranged such that the disengagement-preventive protuberance 40 in engagement with the engaging recess 41 effectively prevents elastic deformation or displacement of the latching arms 32 in the radially outward direction of the female connector 12 after the connection of the pipe 10 and the female connector 12, so that the removal of the pipe 10 from the female connector 12 can be effectively prevented even when a force acts on the latching arms 32 in the radially outward direction while a pull force acts on the pipe 10 in the axial direction of removing the pipe 10 from the female connector 12.

While the preferred embodiment of this invention has been described above for illustrative purpose only, it is to be understood that the invention is not limited to the details of the preferred embodiment.

In the above embodiment, the second engaging means for inhibiting the rotation of the latching indicator member 14 relative to the female connector 12 before the insertion of the pipe 10 into the female connector 12 is constituted by the openings 54 of the latching indicator member 14 and the latching projections 34 of the latching arms 32 formed on the large-diameter cylindrical portion 18 of the female connector 18. However, the second engaging means is not limited to that of the illustrated embodiment.

Figure 19:
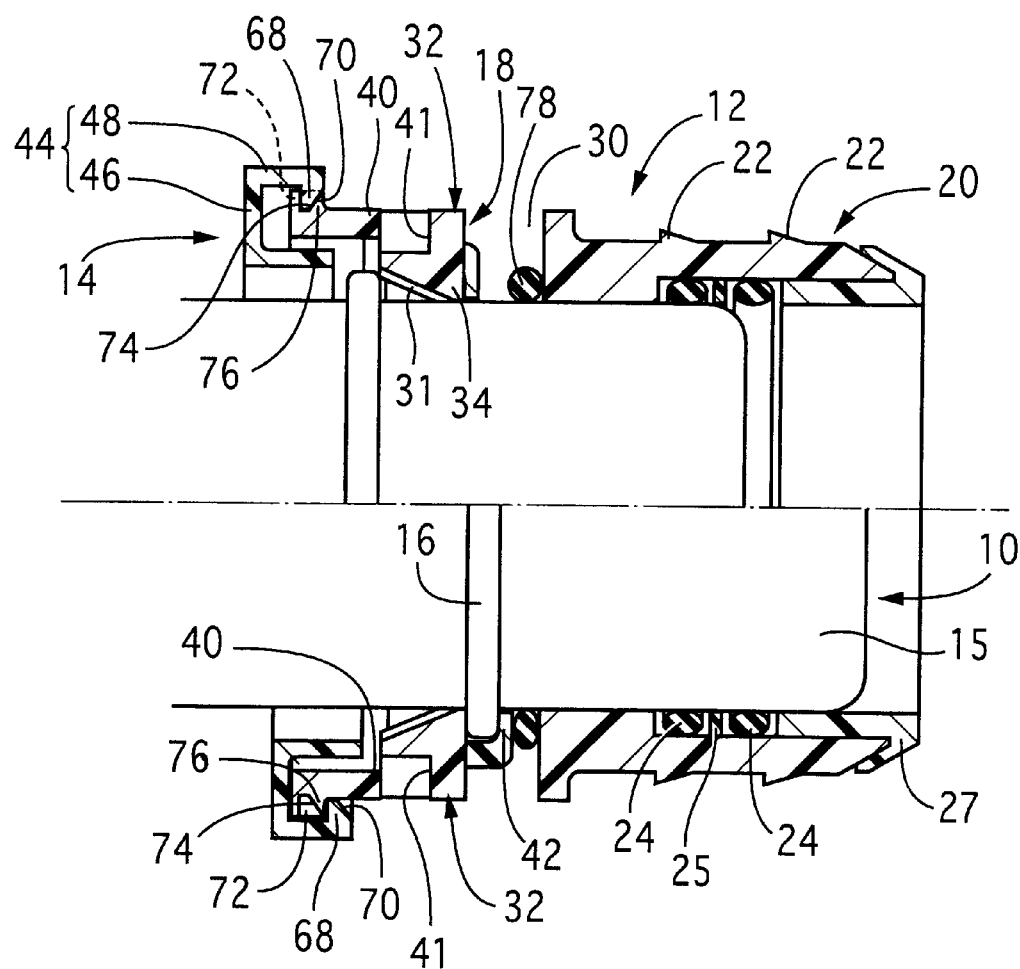
FIG. 19 is a partial cross sectional view of a quick-action connector assembly according to another embodiment of this invention, an upper half of the view showing a pipe inserted into a female connector while a lower half of the view showing the pipe and the female connector in a mutually latched state.

For instance, the second engaging means may be constituted by the radially inwardly extending positioning protrusions 50, 50 formed on the L-shaped outward flange 44 of the latching indicator member 14, and the two axially extending grooves 29, 29 formed on the outer circumferential surface of outward flange 28 of the large-diameter portion 18 of the female connector 12, so that the rotation of the latching indicator member 14 relative to the female connector 12 prior to the insertion of the pipe 10 into the female connector 12 is prevented by engagement of each positioning protrusion 50 with the opposed surfaces which define each groove 29 and which are opposed to each other in the circumferential direction of the outward flange 28.

Where the second engaging means is constituted by the positioning protrusions 50, 50 of the latching indicator member 14 and the two grooves 29, 29 of the female connector 12, as described above, those protrusions 50 and grooves 29 may be replaced by two positioning protrusions 68 and two axial grooves 72, as in a quick-action connector assembly according to a second embodiment of this invention shown in FIG. 19. Each of the two positioning protrusions 68 has an inclined end face 70 whose distance of radially inward extension from the cylindrical portion 48 gradually decreases in the direction of insertion of the pipe 10 into the female connector 12. Each of the two grooves 72 has an inclined bottom surface 74 parallel to the inclined end face 70 of the positioning protrusions 68. The inclined bottom surface 74 partially defines a projection 76 formed adjacent to the axially inner end of the groove 72. The positioning protrusions 68 are held in engagement with the respective axial grooves 72 unless the L-shaped outward flange 44 is elastically deformed or displaced in the radially outward direction. In other words, the positioning protrusions 68 and grooves 72 are disengaged from each other only after each positioning protrusion 68 has cleared the projection 76 with a sliding movement of the inclined end face 70 on the inclined bottom surface 74, as a result of radially outward deformation of the L-shaped outward flange 44.

The engagement of the positioning protrusions 68 and axial grooves 72 with each other not only inhibits the rotation of the latching indicator member 14 relative to the female connector 12, but also prevents a free movement of the latching indicator member 14 relative to the female connector 12 in the direction of insertion of the pipe 10 into the female connector 12, prior to the insertion of the pipe 10. Thus, the positioning protrusions 68 and axial grooves 72 eliminate an arrangement designed exclusively for preventing such a free axial movement of the latching indicator member 14. It is to be understood that the same reference signs as used in the first embodiment are used in FIG. 19, to identify the same structural elements or portions as in the first embodiment, a detailed description of which is dispensed with.

The positions at which the positioning protrusions 50, 68 and the axial grooves 29, 72 are formed on the latching indicator member 14 and the female connector 12 are not limited to those in the illustrated embodiments, provided that the positioning protrusions 50, 68 are formed on one of the latching indicator member 14 and female connector 12 while the axial grooves 29, 72 are formed on the other of the latching indicator member 14 and female connector 12.

It is needless to say that the number of the positioning protrusions 50, 68 and the number of the axial grooves 29, 72 are not limited to those in the illustrated embodiments.

While the third engaging means in the illustrated embodiments is constituted by the engaging protrusions 35 formed on the latching arms 32 of the female connector 12 and the receptacles 60 in the form of holes formed adjacent to the narrow portions 58 of the openings 54 of the latching indicator member 14, it is possible to form recesses in the outer circumferential surface of the latching indicator member 14, so that the recesses serve as the receptacles 60 engageable with the engaging protrusions 35.

It is to be understood that the engaging protrusions 35 and the receptacles 60 may be formed as desired, provided that the engaging protrusions 35 are formed on one of the inner surface of the latching arms 32 from which the latching projections 34 extend, and a surface of the latching indicator member 14 which is opposed to the inner surface of the latching arms 32, while the receptacles 60 are formed in the other of the inner surface of the latching arms 32 and the above-indicated surface of the latching indicator member 12.

In the illustrated embodiments, the inclined cam surface 36 is formed on the end face of each engaging protrusion 35, an inclined cam surface may be provided by an end face of an engaging protrusion which is different from the engaging protrusion 35 and which is formed on the inner surface of each latching arm 32 from which the latching projection extends. In this case, the latching indicator member 14 is provided with a slidably contacting portion for sliding movement on the inclined cam surface.

Further, a suitable sealing member such as an O-ring 78 may be interposed between the engaging inward flange 42 of the latching indicator member 14 and the corresponding end face of the thick-walled end part 26 of the small-diameter cylindrical portion 20 of the female connector 12, as shown in FIG. 19. In this case, the sealing member in the form of the O-ring 78 is compressed by and between the engaging inward flange 42 and the end face of the thick-walled end part of the small-diameter cylindrical portion 20 when the latching indicator member 14 is advanced in the female connector 12 during insertion of the pipe 10 into the female connector 12. The sealing member is effective to prevent entry of any foreign matters into the female connector 12 through the first arm (with the larger axial dimension) of the U-shaped slot 30 formed through the large-diameter cylindrical portion 18 of the female connector 12.

The latching indicator member 14 is not limited in its configuration to the cylindrical shape in the illustrated embodiments, but may have any desired shape such as an annular shape or a C-shape in transverse cross section, provided the latching indicator member 14 is substantially cylindrical or annular and can be fitted substantially within the female connector 12.

Although the quick-action connector assemblies according the illustrated embodiments of this invention include the one-piece female member consisting of a first axial portion into which the female member is inserted and a second axial portion on which a tubular body to be connected to the male member is fixedly fitted, it is to be understood that the principle of the present invention is equally applicable to a quick-action connector assembly including a female member consisting of two separate tubular members which correspond to the above-indicated first and second axial portions and which are fixed to each other by a suitable fixing or bonding means or member.

It is to be understood that the present invention may be embodied with various other changes, modifications and improvements, which may occur to those skilled in the art, in the light of the foregoing teachings, without departing from the spirit and scope of the invention defined in the following claims:

What is claimed is:

1. A quick-action connector assembly including a tubular male member having an engaging end portion and an annular protrusion formed on an outer circumferential surface of said engaging end portion, and a female member having a cylindrical end portion into which said male member is to be inserted and which has a cylindrical wall formed with at least one latching arm each of which has a latching projection extending radially inwardly of said cylindrical wall, each of said at least one latching arm being elastically deformable in a radial direction of said cylindrical end portion, and wherein elastic deformation of said each latching arm in a radially outward direction of said cylindrical end portion of said female member during insertion of said male member into said cylindrical end portion permits said annular protrusion to clear said latching projection of said each latching arm and to be latched in engagement with said latching projection, so as to prevent an axial movement of said male member in a direction away from said female member, said quick-action connector assembly comprising:

(a) a latching indicator member into which said male member is inserted and which is substantially cylindrical in shape and assembled within said cylindrical end portion of said female member;

(b) first engaging means interposed between said latching indicator member and said male member, for effecting engagement between said latching indicator member and said male member upon insertion of said male member into said cylindrical end portion of said female member, to permit an axial movement of said latching indicator member together with said male member in a direction of insertion of the male member; and (c) second engaging means interposed between said latching indicator member and said female member, for effecting engagement between said latching indicator member and said female member, to substantially inhibit rotation of said latching indicator member relative to said female member prior to the insertion of said male member into said cylindrical end portion of said female member, and for disengaging said latching indicator member and said female member from each other to permit the rotation of said latching indicator member relative to said female member on the basis of said axial movement of said latching indicator in the direction of insertion of said male member by said first engaging means after said annular protrusion has been latched in engagement with said latching projection of said each latching arm as a result of the insertion of said male member into said cylindrical end portion, and wherein a checking if said annular protrusion of said male member inserted into said female member has been latched in engagement with said latching projection of said each latching arm can be effected depending upon whether the rotation of said latching indicator member relative to said female member is inhibited or permitted.

2. The quick-action connector assembly according to claim 1, further comprising third engaging means interposed between said latching indicator member and said female member, for effecting engagement between said latching indicator member and said female member to substantially inhibit an axial movement of said latching indicator member in said direction of insertion of said male member prior to the insertion of said male member into said cylindrical end portion of said female member, and for disengaging said latching indicator member and said female member from each other to permit said axial movement of said latching indicator member in said direction of insertion after said annular protrusion of said male member has cleared said latching projection of said each latching arm on the basis of said elastic deformation of said each latching arm in said radially outward direction of said cylindrical end portion of said female member during the insertion of said male member into said cylindrical end portion.

3. The quick-action connector assembly according to claim 2, wherein said each latching arm has an inner surface on which said latching projection is formed, and said third engaging means includes an engaging protrusion formed on said inner surface of said each latching arm and a receptacle formed in a cylindrical wall of said latching indicator such that said engaging protrusion is engageable with said receptacle, said cylindrical wall of said latching member having opposed surfaces which partially define said receptacle and which are opposed to each other in said direction of insertion of said male member, said engaging protrusion being held in engagement with said opposed surfaces of said receptacle prior to the insertion of said male member into said cylindrical end portion of said female member to thereby substantially inhibit said axial movement of said latching indicator member in said direction of insertion, and wherein said engaging protrusion is disengaged from said receptacle to permit said axial movement of said latching indicator member in said direction of insertion when said annular protrusion of said male member has cleared said latching projection of said each latching arm on the basis of said elastic deformation of said each latching arm in said radially outward direction during the insertion of said male member into said cylindrical end portion.

4. The quick-action connector assembly according to claim 1, wherein said first engaging means includes said annular protrusion of said male member, and an engaging inward flange formed on said latching indicator member such that said engaging inward flange extends in a radially inward direction of said latching indicator member, said annular protrusion being engageable with said engaging inward flange during the insertion of said male member into said cylindrical end portion of said female member so that said latching indicator member is moved together with said male member in said direction of insertion of said male member.

5. The quick-action connector assembly according to 1, wherein said second engaging means includes at least one projection formed on one of two portions of said latching indicator member and said female member, which two portions are opposed to each other in the radial direction of said female member, and at least one recess formed in the other of said two portions, and wherein before the insertion of said male member into said cylindrical end portion of said female member, said at least one projection is held in engagement with opposed surfaces which partially define said at least one recess and which are opposed to each other in a circumferential direction of said female member so that the rotation of said latching indicator member relative to said female member is substantially inhibited, said at least one projection being disengaged from said at last one recess as a result of said axial movement of said latching indicator member together with said male member in said direction of insertion of said male member during the insertion of said male member into said cylindrical end portion of said female member, which axial movement is permitted by said first engaging means after said annular protrusion of said male member has been latched in engagement with said latching projection of said each latching arm, so that the rotation of said latching indicator member relative to said female member is permitted, while said annular protrusion is latched in engagement with said latching projection.

6. The quick-action connector assembly according to claim 1, wherein said second engaging means includes said latching projection of said each latching arm, and an opening formed in a cylindrical wall of said latching indicator member such that a dimension of said opening as measured in said direction of insertion of said male member is large enough to permit said latching projection to be received in said opening, said opening consisting of a narrow portion and a wide portion which are respectively located downstream and upstream in said direction of insertion, and wherein before the insertion of said male member into said cylindrical end portion of said female member, at least a portion of said latching projection is held in engagement with opposed surfaces which partially define said narrow portion of said opening and which are opposed to each other in a circumferential direction of said latching indicator member so that the rotation of said latching indicator member relative to said female member is substantially inhibited, said latching projection being moved into said wide portion of said opening and disengaged from said narrow portion as a result of said axial movement of said latching indicator member together with said male member in said direction of insertion of said male member during the insertion of said male member into said cylindrical end portion of said female member, which axial movement is permitted by said first engaging means after said annular protrusion of said male member has been latched in engagement with said latching projection of said each latching arm so that said latching indicator member is permitted to be rotated relative to said female member by an angle corresponding to a dimension of said wide portion as measured in said circumferential direction while said annular protrusion is latched in engagement with said latching projection.

7. The quick-action connector assembly according to claim 1, further comprising a locking mechanism operable to lock said latching indicator member in a predetermined angular position relative to said female member for preventing free rotation of said latching indicator member relative to said female member while said second engaging means is placed in a state of permitting the rotation of said latching indicator member relative to said female member after said annular protrusion of said male member inserted in said cylindrical end portion of said female member has been latched in engagement with said latching projection of said each latching arm.

8. The quick-action connector assembly according to claim 1, wherein said each latching arm has an inner surface on which said latching projection is formed, said inner surface providing an inclined cam surface which extends in a circumferential direction of said female member and which is inclined such that a position of said inclined cam surface in a radial direction of said female member gradually increases in said circumferential direction, and said latching indicator member includes a slidably contacting portion which is slidably movable on said inclined cam surface during rotation of said latching indicator member relative to said female member, to cause elastic deformation of said each latching arm in said radially outward direction of said female member, for thereby disengaging said annular protrusion of said male member from said latching projection of said each latching arm.

* * * * *

UNITED STATES PATENT AND TRADEMARK OFFICE
CERTIFICATE OF CORRECTION

PATENT NO. : 6,637,780 B2 Page 1 of 1
DATED : October 28, 2003
INVENTOR(S) : Atsuo Miyajima and Akira Takayanagi It is certified that error appears in the above-identified patent and that said Letters Patent is hereby corrected as shown below:

<u>Title page,</u>
Item [57], ABSTRACT,
Line 5, please change "member" to -- member, --
Line 14, please change "letching projecting" to -- latching projection --

<u>Column 22,</u>
Lines 18 and 30, please delete the ","

<u>Column 23,</u>
Line 66, please delete the ","

<u>Column 24,</u>
Lines 2 and 60, please delete the ","

Signed and Sealed this

Sixteenth Day of December, 2003

JAMES E. ROGAN
*Director of the United States Patent and Trademark Office*